(12) United States Patent
Matsui et al.

(10) Patent No.: US 12,536,641 B2
(45) Date of Patent: Jan. 27, 2026

(54) VISUAL INSPECTION SYSTEM FOR ANNULAR PRODUCT

(71) Applicant: DAIICHI JITSUGYO VISWILL CO., LTD., Osaka (JP)

(72) Inventors: Koji Matsui, Osaka (JP); Koichi Sasaki, Osaka (JP)

(73) Assignee: DAIICHI JITSUGYO VISWILL CO., LTD., Osaka (JP)

(*) Notice: Subject to any disclaimer, the term of this patent is extended or adjusted under 35 U.S.C. 154(b) by 318 days.

(21) Appl. No.: 18/119,939

(22) Filed: Mar. 10, 2023

(65) Prior Publication Data

US 2023/0298153 A1 Sep. 21, 2023

(30) Foreign Application Priority Data

Mar. 15, 2022 (JP) .................................. 2022-040450

(51) Int. Cl.
*G06T 7/00* (2017.01)
*G01N 21/88* (2006.01)

(52) U.S. Cl.
CPC ....... *G06T 7/0004* (2013.01); *G01N 21/8806* (2013.01); *G01N 2021/8841* (2013.01)

(58) Field of Classification Search
CPC .............. G06T 7/0004; G01N 21/8806; G01N 2021/8841; G01N 2021/845; G01N 21/892; G01N 2021/8845
See application file for complete search history.

(56) References Cited

U.S. PATENT DOCUMENTS

| 4,677,473 | A | * | 6/1987 | Okamoto | ........... G01N 21/8806 356/613 |
| 5,302,836 | A | * | 4/1994 | Siu | .......... H01L 24/78 250/559.34 |
| 5,580,163 | A | * | 12/1996 | Johnson, II | ............. F21V 19/02 362/800 |
| 6,022,124 | A | * | 2/2000 | Bourn | .................... G03B 15/03 362/231 |
| 6,064,479 | A | * | 5/2000 | Knapp | ............... G01N 21/8806 356/240.1 |

(Continued)

FOREIGN PATENT DOCUMENTS

| BR | 112017007762 A2 * | 1/2018 | ........... H04N 5/2252 |
| CN | 106062780 A * | 10/2016 | ............. G01B 11/24 |

(Continued)

*Primary Examiner* — Mohamed K Amara
(74) *Attorney, Agent, or Firm* — von Briesen & Roper, s.c.

(57) ABSTRACT

A visual inspection system includes a conveyance device conveying an inspection target on a glass plate in a rotating direction of the glass plate, an outer-side-surface image capturing device capturing an image of the inspection target at an outer-side-surface image capturing position, and a judgment device judging based on the captured image whether the inspection target is defective in appearance or not. The outer-side-surface image capturing device has an illumination unit for inspection and three image capturing units arranged around the illumination unit. Each image capturing unit includes first and second mirrors receiving light reflected from an outer side surface of the inspection target at position below the illumination unit, a third mirror reflecting reflected light from the first and second mirrors upward, and an imaging camera arranged above the third mirror.

16 Claims, 11 Drawing Sheets

(56) References Cited

U.S. PATENT DOCUMENTS

| | | | | |
|---|---|---|---|---|
| 6,445,452 B1 * | 9/2002 | Kondou | ............ | G01N 21/9508 356/237.1 |
| 6,496,272 B1 * | 12/2002 | Watanabe | .......... | H05K 13/0813 356/614 |
| 6,657,771 B2 * | 12/2003 | Okayama | ............... | G02B 6/351 359/290 |
| 6,954,268 B2 * | 10/2005 | Naiki | .................... | G01N 21/88 356/237.2 |
| 2001/0035953 A1 * | 11/2001 | Morita | ................. | G01N 21/958 356/239.2 |
| 2002/0196338 A1 * | 12/2002 | Tham | ................. | G01N 21/8806 382/141 |
| 2004/0114153 A1 * | 6/2004 | Andersen | ............... | G01B 11/00 356/606 |
| 2004/0119971 A1 * | 6/2004 | Isozaki | ............. | G01N 21/9501 356/237.2 |
| 2007/0296963 A1 * | 12/2007 | Parker | ................ | G01N 21/9508 356/240.1 |
| 2014/0301632 A1 * | 10/2014 | Ikeda | ........................ | G06T 7/70 382/152 |
| 2018/0188021 A1 * | 7/2018 | Wagner | .................. | G01B 11/30 |
| 2020/0360968 A1 * | 11/2020 | Nygaard | ............... | B07C 5/3416 |
| 2021/0088326 A1 * | 3/2021 | Osada | ................. | G01B 11/24 |
| 2021/0231586 A1 * | 7/2021 | Sugata | ................. | G01N 21/956 |
| 2024/0054801 A1 * | 2/2024 | Filler | ................... | G06V 10/811 |
| 2024/0414905 A1 * | 12/2024 | Kikuchi | .................. | G06T 7/001 |
| 2025/0200740 A1 * | 6/2025 | Tu | ........................ | G06V 10/141 |

FOREIGN PATENT DOCUMENTS

| | | | | |
|---|---|---|---|---|
| CN | 111753630 A | * | 10/2020 | ......... G01N 21/8806 |
| CN | 118258764 A | * | 6/2024 | ........... G01N 21/892 |
| EP | 3482193 B1 | * | 6/2022 | ............. H04N 23/56 |
| JP | H11304721 A | * | 11/1999 | ......... G01N 21/8803 |
| JP | 2021-051032 A | | 4/2021 | |

* cited by examiner

VISUAL INSPECTION SYSTEM FOR ANNULAR PRODUCT

BACKGROUND

Technical Field

The present disclosure relates to a visual inspection system that captures an image of the appearance of an object using an imaging camera and processes the captured image to judge whether the object is defective in appearance or not, and more particularly to a visual inspection system which is capable of preferably inspecting the appearance of an annular resin product.

Description of the Related Art

A known example of the visual inspection system for annular resin product as mentioned above is disclosed in Japanese Unexamined Patent Application Publication No. 2021-51032.

This visual inspection system includes a conveyance device, a front-surface image capturing device, a rear-surface image capturing device, an outer-side-surface image capturing device, an inner-side-surface image capturing device, and a judgment device. The conveyance device has a transparent circular glass plate arranged horizontally and rotates the glass plate horizontally to convey an inspection target (annular resin product) fed on the glass plate in the rotating direction of the glass plate. The front-surface image capturing device captures an image of the front surface of the inspection target being conveyed by the conveyance device. The rear-surface image capturing device captures an image of the rear surface of the inspection target. The outer-side-surface image capturing device captures an image of the outer side surface of the inspection target. The inner-side-surface image capturing device captures an image of the inner side surface of the inspection target. The judgement device processes the images captured by the image capturing devices to judge whether the inspection target is defective in appearance or not.

In this visual inspection system, the front-surface image capturing device, the rear-surface image capturing device, the outer-side-surface image capturing device, and the inner-side-surface image capturing device capture images of the front surface, rear surface, outer side surface, and inner side surface of the inspection target while the inspection target fed on the glass plate of the conveyance device is being conveyed in the rotating direction of the glass plate, and the judgement device processes the captured images to judge whether the inspection target is defective in appearance or not.

A representative example of the annular resin product is an O-ring that is molded using a mold. Such a molded product has the characteristic that defects, such as a burr that occurs at the parting line of the two halves of the mold, may be present on the inner and outer side surfaces of the product. Therefore, inspection of the appearance of such an annular resin product has to reliably inspect the inner and outer side surfaces of the product.

Accordingly, the outer-side-surface image capturing device in the above-described conventional visual inspection system consists of an outer-side-surface imaging camera, a plurality of prisms, and an illumination unit for outer side surface. The outer-side-surface imaging camera is arranged above the glass plate at an outer-side-surface image capturing position set on the conveyance path for the inspection target and captures an image of the outer side surface of the inspection target present at the outer-side-surface image capturing position. The prisms are arranged below the outer-side-surface imaging camera radially at equal intervals about a vertical axis passing through the center point of the outer-side-surface image capturing position and have optical paths leading light reflected from the outer side surface of the inspection target to the outer-side-surface imaging camera. The illumination unit for outer side surface illuminates the inspection target present at the outer-side-surface image capturing position.

The illumination unit for outer side surface consists of a red illumination unit for outer side surface inspection, an upper highlighting illumination unit for outer side surface, and a lower highlighting illumination unit for outer side surface. The red illumination unit for outer side surface inspection includes an annular light projector arranged coaxially with the vertical axis between the glass plate and the prisms and radiates red light toward the center thereof from the light projector to mainly illuminate the outer side surface of the inspection target present at the outer-side-surface image capturing position. The upper highlighting illumination unit for outer side surface is arranged inside the prisms above the outer-side-surface image capturing position and radiates red light toward the outer-side-surface image capturing position located below. The lower highlighting illumination unit for outer side surface is arranged below the glass plate at the outer-side-surface image capturing position and radiates red light upward.

In this outer-side-surface image capturing device, the outer side surface as the surface to be inspected is illuminated with red light so that a sufficient amount of reflected light from the outer side surface is led to the outer-side-surface imaging camera via the prisms. Therefore, if a dent or scratch is present on the outer side surface of the inspection target, an image with the dent or scratch highlighted is captured by the outer-side-surface imaging camera. This enables the judgement device to precisely determine whether or not a dent or scratch is present on the outer side surface of the inspection target. Further, the outer side surface of the inspection target is illuminated from oblique directions by the upper highlighting illumination unit for outer side surface and the lower highlighting illumination unit for outer side surface. This enables a dent or scratch present on the outer side surface of the inspection target to be more strongly highlighted.

Further, the inner-side-surface image capturing device in the above-described conventional visual inspection system consists of an inner-side-surface imaging camera, a plurality of prisms, and an illumination unit for inner side surface. The inner-side-surface imaging camera is arranged above the glass plate at an inner-side-surface image capturing position set on the conveyance path for the inspection target and captures an image of the inner side surface of the inspection target present at the inner-side-surface image capturing position. The prisms are arranged below the inner-side-surface imaging camera radially at equal intervals about a vertical axis passing through the center point of the inner-side-surface image capturing position and have optical paths leading light reflected from the inner side surface of the inspection target to the inner-side-surface imaging camera. The illumination unit for inner side surface illuminates the inspection target present at the inner-side-surface image capturing position.

The illumination unit for inner side surface consists of a red illumination unit for inner side surface inspection, an upper highlighting illumination unit for inner side surface, and a lower highlighting illumination unit for inner side surface. The red illumination unit for inner side surface inspection includes an annular light projector arranged coaxially with the vertical axis between the glass plate and the prisms and radiates red light toward the center thereof from the light projector to illuminate the inner side surface of the inspection target present at the inner-side-surface image capturing position. The upper highlighting illumination unit for inner side surface is arranged inside the prisms above the inner-side-surface image capturing position and radiates red light toward the inner-side-surface image capturing position located below. The lower highlighting illumination unit for inner side surface is arranged below the glass plate at the inner-side-surface image capturing position and radiates red light upward.

In this inner-side-surface image capturing device, similarly to the outer-side-surface image capturing device, the inner side surface as the surface to be inspected is illuminated with red light so that a sufficient amount of reflected light from the inner side surface is led to the inner-side-surface imaging camera via the prisms. Therefore, if a dent or scratch is present on the inner side surface of the inspection target, an image with the dent or scratch highlighted is captured by the inner-side-surface imaging camera. This enables the judgement device to precisely determine whether or not a dent or scratch is present on the inner side surface of the inspection target. Further, the inner side surface of the inspection target is illuminated from oblique directions by the upper highlighting illumination unit for inner side surface and the lower highlighting illumination unit for inner side surface. This enables a dent or scratch present on the inner side surface of the inspection target to be more strongly highlighted.

SUMMARY OF THE DISCLOSURE

The above-described conventional visual inspection system has enabled the outer and inner side surfaces of an annular resin product to be more precisely inspected. However, because of its structure, the visual inspection system has blind areas in the imaging directions in the outer-side-surface image capturing device and inner-side-surface image capturing device. Therefore, the objective of precisely inspecting the entire surface of an annular resin product has not been sufficiently achieved (see FIG. 11).

Specifically, the outer-side-surface image capturing device is configured to lead light reflected from the outer side surface of the inspection target to a single outer-side-surface imaging camera through the plurality of prisms arranged radially at equal intervals about the vertical axis passing through the center point of the outer-side-surface image capturing position; therefore, the annular red illumination unit for outer side surface inspection that illuminates the outer side surface of the inspection target is arranged between the inspection target and the prisms forming the imaging optical paths. Consequently, the imaging optical paths (viewing angles) formed by the prisms are such that the inspection target is viewed from obliquely above, so that a lower portion of the outer side surface of the inspection target cannot be imaged (see FIG. 11).

Similarly to the outer-side-surface image capturing device, the inner-side-surface image capturing device is configured to lead light reflected from the inner side surface of the inspection target to a single inner-side-surface imaging camera through the plurality of prisms arranged radially at equal intervals about the vertical axis passing through the center point of the inner-side-surface image capturing position; therefore, the annular red illumination unit for inner side surface inspection that illuminates the inner side surface of the inspection target is arranged between the inspection target and the prisms forming the imaging optical paths. Consequently, the imaging optical paths (viewing angles) formed by the prisms are such that the inspection target is viewed from obliquely above, so that a lower portion of the inner side surface of the inspection target cannot be imaged (see FIG. 11). Further, the upper highlighting illumination unit for inner side surface in the inner-side-surface image capturing device that mainly illuminates the inner side surface of the inspection target has to be arranged inside the prisms; therefore, the upper highlighting illumination unit for inner side surface is limited in size. This leads to the inner side surface of the inspection target being illuminated with an insufficient amount of light, which is disadvantageous in that it is difficult to obtain uniform images.

The present disclosure has been achieved in view of the above-described circumstances, and an object of the disclosure is to provide a visual inspection system capable of inspecting the appearance of an annular product with respect to a broader area of the outer side surface thereof and also with respect to a broader area of the inner side surface thereof than the conventional system.

To solve the above-described problems, the present disclosure provides a visual inspection system inspecting an appearance of an annular resin product as an inspection target, including at least:

a conveyance device having a transparent circular glass plate arranged horizontally, and configured to rotate the glass plate horizontally to convey the inspection target fed on the glass plate in a rotating direction of the glass plate;

an outer-side-surface image capturing device configured to capture an image of an outer side surface of the inspection target being conveyed by the conveyance device at an outer-side-surface image capturing position set on a conveyance path for the inspection target; and a judgment device configured to process the image captured by the outer-side-surface image capturing device to judge whether the inspection target is defective in appearance or not, wherein:

the outer-side-surface image capturing device has:
a red illumination unit for outer side surface inspection arranged above the glass plate at the outer-side-surface image capturing position; and
first, second, and third outer-side-surface image capturing units arranged around the red illumination unit for outer side surface inspection at equal intervals in a circumferential direction about a vertical axis passing through a center point of the outer-side-surface image capturing position;

the red illumination unit for outer side surface inspection includes an annular light projector arranged coaxially with the vertical axis and is configured to radiate red light toward a center thereof from the light projector to mainly illuminate the outer side surface of the inspection target present at the outer-side-surface image capturing position; and each of the first, second, and third outer-side-surface image capturing units includes:
first and second mirrors arranged with a predetermined spacing therebetween to receive light reflected from the outer side surface of the inspection target at a position below the red illumination unit for outer side surface inspection;

a third mirror having two reflective surfaces receiving light reflected from the first and second mirrors and reflecting the light upward; and an outer-side-surface imaging camera arranged above the third mirror and configured to receive light from two optical paths reflected from the third mirror and generate a color image.

In the visual inspection system according to this aspect (first aspect), an annular resin product as an inspection target is appropriately fed onto the glass plate of the conveyance device and conveyed in the rotating direction of the glass plate by horizontal rotation of the glass plate. During the conveyance, color images of the outer side surface of the inspection target are captured by the outer-side-surface imaging cameras at the outer-side-surface image capturing position. Based on these captured color images, judgment whether the inspection target is defective in appearance or not is carried out by the judgment device.

At the outer-side-surface image capturing position, the outer side surface of the inspection target is illuminated with red light by the red illumination unit for outer side surface inspection. Reflected red light is unlikely to be scattered. Therefore, a sufficient amount of reflected light from the outer side surface of the inspection target is led to the outer-side-surface imaging camera. Therefore, if a dent or scratch is present on the outer side surface of the inspection target, an image with the dent or scratch highlighted is captured by the outer-side-surface imaging camera. This enables the judgment device to precisely determine whether or not a dent or scratch is present on the outer side surface of the inspection target.

Further, the visual inspection system according to the first aspect is configured such that the outer side surface of the inspection target is imaged from three directions therearound with two directions at a predetermined angle in each of the three directions, i.e., from six directions in total, by the first, second, and third outer-side-surface image capturing units and such that images of the inspection target from a position below the red illumination unit for outer side surface inspection are captured. Therefore, images are captured which cover a broader area of the outer side surface of the inspection target than those in the conventional art. Based on these images covering a broader area of the outer side surface of the inspection target, the appearance judgment is carried out. Thus, judgment whether the inspection target is defective in appearance or not is carried out with respect to a broader area of the outer side surface of the inspection target than in the conventional art.

The visual inspection system according to the first aspect may be configured according to the following aspect: a light-receiving optical path of the first mirror and a light-receiving optical path of the second mirror form an angle of 60° with respect to each other about the outer-side-surface image capturing position in a horizontal plane. With the visual inspection system according to this aspect (second aspect), the entire periphery of the outer side surface of the inspection target is imaged uniformly.

The visual inspection systems according to the first and second aspects may be configured according to the following aspect: the light-receiving optical path of the first mirror and the light-receiving optical path of the second mirror each form an angle of 3.5° to 4.5° with respect to the horizontal plane. With the visual inspection system according to this aspect (third aspect), images are captured which cover the lower area of the outer side surface of the inspection target to the lowest extent possible.

The visual inspection systems according to the first to third aspects may be configured according to the following aspect:

the outer-side-surface image capturing device further has:
an upper highlighting illumination unit for outer side surface disposed inside the red illumination unit for outer side surface inspection above the outer-side-surface image capturing position and configured to radiate red light toward the outer-side-surface image capturing position located below; and a lower highlighting illumination unit for outer side surface arranged below the glass plate at the outer-side-surface image capturing position and configured to radiate red light upward.

The visual inspection system according to this aspect (fourth aspect) is configured such that the outer side surface of the inspection target is illuminated by the upper highlighting illumination unit for outer side surface and the lower highlighting illumination unit for outer side surface. Therefore, a dent or scratch present on the outer side surface of the inspection target is more strongly highlighted.

The visual inspection systems according to the first to fourth aspects may be configured according to the following aspect:

the visual inspection system further includes:
a lower-inner-side-surface image capturing device configured to capture an image of a lower inner side surface of the inspection target being conveyed by the conveyance device at a lower-inner-side-surface image capturing position set on the conveyance path; and an upper-inner-side-surface image capturing device configured to capture an image of an upper inner side surface of the inspection target at an upper-inner-side-surface image capturing position set on the conveyance path, wherein:

the lower-inner-side-surface image capturing device has:
a red illumination unit for lower inner side surface inspection arranged below the glass plate at the lower-inner-side-surface image capturing position; and first, second, and third lower-inner-side-surface image capturing units arranged around the red illumination unit for lower inner side surface inspection at equal intervals in a circumferential direction about a vertical axis passing through a center point of the lower-inner-side-surface image capturing position;

the red illumination unit for lower inner side surface inspection includes an annular light projector arranged coaxially with the vertical axis at the lower-inner-side-surface image capturing position and is configured to radiate red light toward a center thereof from the light projector to mainly illuminate the lower inner side surface of the inspection target present at the lower-inner-side-surface image capturing position;

each of the first, second, and third lower-inner-side-surface image capturing units includes:
first and second mirrors arranged with a predetermined spacing therebetween to receive light reflected from the lower inner side surface of the inspection target at a position below the red illumination unit for lower inner side surface inspection;

a third mirror having two reflective surfaces receiving light reflected from the first and second mirrors and reflecting the light downward; and a lower-inner-side-surface imaging camera arranged below the third mirror and configured to receive light from two optical paths reflected from the third mirror and generate a color image;

the upper-inner-side-surface image capturing device has:
  a red illumination unit for upper inner side surface inspection arranged above the glass plate at the upper-inner-side-surface image capturing position; and
  first, second, and third upper-inner-side-surface image capturing units arranged around the red illumination unit for upper inner side surface inspection at equal intervals in a circumferential direction about a vertical axis passing through a center point of the upper-inner-side-surface image capturing position;
  the red illumination unit for upper inner side surface inspection includes an annular light projector arranged coaxially with the vertical axis at the upper-inner-side-surface image capturing position and is configured to radiate red light toward a center thereof from the light projector to mainly illuminate the upper inner side surface of the inspection target present at the upper-inner-side-surface image capturing position;
  each of the first, second, and third upper-inner-side-surface image capturing units includes:
    first and second mirrors arranged with a predetermined spacing therebetween to receive light reflected from the upper inner side surface of the inspection target at a position above the red illumination unit for upper inner side surface inspection;
    a third mirror having two reflective surfaces receiving light reflected from the first and second mirrors and reflecting the light upward; and
    an upper-inner-side-surface imaging camera arranged above the third mirror and configured to receive light from two optical paths reflected from the third mirror and generate a color image; and
  the judgment device is configured to process the image captured by the outer-side-surface image capturing device and the images captured by the lower-inner-side-surface image capturing device and the upper-inner-side-surface image capturing device to judge whether the inspection target is defective in appearance or not.

The visual inspection system according to this aspect (fifth aspect) is configured such that the lower inner side surface of the inspection target is imaged from three directions therearound with two directions at a predetermined angle in each of the three directions, i.e., from six directions in total, by the first, second, and third lower-inner-side-surface image capturing units and the upper inner side surface of the inspection target is imaged from three directions therearound with two directions at a predetermined angle in each of the three directions, i.e., from six directions in total, by the first, second, and third upper-inner-side-surface image capturing units. Therefore, images are captured which cover a broader area of the inner side surface of the inspection target than those in the conventional art. Based on these images covering a broader area of the inner side surface of the inspection target, the appearance judgment is carried out. Thus, judgment whether the inspection target is defective in appearance or not is carried out with respect to a broader area of the inner side surface of the inspection target than in the conventional art.

The visual inspection system according to the fifth aspect may be configured according to the following aspect: a light-receiving optical path of the first mirror and a light-receiving optical path of the second mirror in the lower-inner-side-surface image capturing device form an angle of 60° with respect to each other about the lower-inner-side-surface image capturing position in a horizontal plane; and a light-receiving optical path of the first mirror and a light-receiving optical path of the second mirror in the upper-inner-side-surface image capturing device form an angle of 60° with respect to each other about the upper-inner-side-surface image capturing position in a horizontal plane. With the visual inspection system according to this aspect (sixth aspect), the entire periphery of the inner side surface of the inspection target is imaged uniformly.

The visual inspection systems according to the fifth and sixth aspects may be configured according to the following aspect: the light-receiving optical path of the first mirror and the light-receiving optical path of the second mirror in the lower-inner-side-surface image capturing device and the light-receiving optical path of the first mirror and the light-receiving optical path of the second mirror in the upper-inner-side-surface image capturing device each from an angle of 39.5° to 40.5° with respect to the horizontal plane. With the visual inspection system according to this aspect (seventh aspect), images are captured which cover the lower and upper areas of the inner side surface of the inspection target to the lowest and highest extents possible.

The visual inspection systems according to the fifth to seventh aspects may be configured according to the following aspect:
  the lower-inner-side-surface image capturing device further has:
    a lower highlighting illumination unit for lower inner side surface arranged below the red illumination unit for lower inner side surface inspection below the lower-inner-side-surface image capturing position and configured to radiate red light toward the lower-inner-side-surface image capturing position located above; and
    an upper highlighting illumination unit for lower inner side surface arranged above the glass plate at the lower-inner-side-surface image capturing position and configured to radiate red light downward; and
  the upper-inner-side-surface image capturing device further has:
    an upper highlighting illumination unit for upper inner side surface arranged above the red illumination unit for upper inner side surface inspection above the upper-inner-side-surface image capturing position and configured to radiate red light toward the upper-inner-side-surface image capturing position located below; and
    a lower highlighting illumination unit for upper inner side surface arranged below the glass plate at the upper-inner-side-surface image capturing position and configured to radiate red light upward.

The visual inspection system according to this aspect (eighth aspect) is configured such that the inner side surface of the inspection target is illuminated by the upper highlighting illumination unit for lower inner side surface, the lower highlighting illumination unit for lower inner side surface, the upper highlighting illumination unit for upper inner side surface, and the lower highlighting illumination unit for upper inner side surface. Therefore, a dent or scratch present on the inner side surface of the inspection target is more strongly highlighted.

As described above, the visual inspection system according to the present disclosure is configured such that the outer side surface of the inspection target is imaged from three directions therearound with two directions at a predetermined angle in each of the three directions, i.e., from six directions in total, by the first, second, and third outer-side-surface image capturing units and such that images of the inspection target from a position below the red illumination unit for outer side surface inspection are captured. Therefore, images are captured which cover a broader area of the outer side surface of the inspection target than those in the conventional art. Based on these images covering a broader area of the outer side surface of the inspection target, the appearance judgment is carried out. Thus, judgment whether the inspection target is defective in appearance or not is carried out with respect to a broader area of the outer side surface of the inspection target than in the conventional art.

Further, with the visual inspection system according to the aspect in which the lower inner side surface of the inspection target is imaged from three directions therearound with two directions at a predetermined angle in each of the three directions, i.e., from six directions in total, by the first, second, and third lower-inner-side-surface image capturing units and the upper inner side surface of the inspection target is imaged from three directions therearound with two directions at a predetermined angle in each of the three directions, i.e., from six directions in total, by the first, second, and third upper-inner-side-surface image capturing units, images are captured which cover a broader area of the inner side surface of the inspection target than those in the conventional art. Based on these images covering a broader area of the inner side surface of the inspection target, the appearance judgment is carried out. Thus, judgment whether the inspection target is defective in appearance or not is carried out with respect to a broader area of the inner side surface of the inspection target than in the conventional art.

BRIEF DESCRIPTION OF THE DRAWINGS

For a more complete understanding of the disclosed methods and apparatus, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatus or which render other details difficult to perceive may have been omitted. It should be understood, of course, that this disclosure is not limited to the particular embodiments illustrated herein.

DETAILED DESCRIPTION

Figure 1:
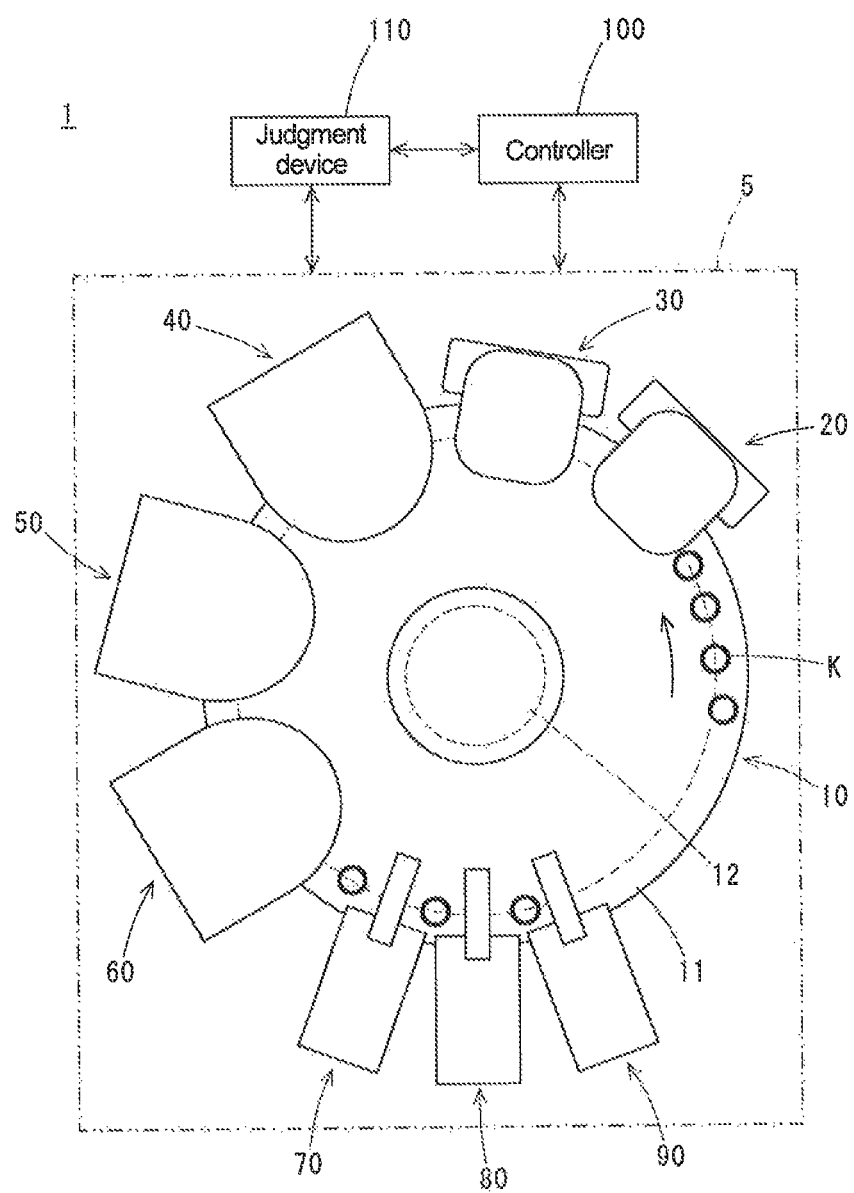
FIG. 1 is a plan view, partially in block diagram form, schematically illustrating a configuration of a visual inspection system according to an embodiment of the present disclosure.

Hereinafter, a specific embodiment of the present disclosure will be described with reference to the drawings. FIG. 1 is a plan view, partially in block diagram form, schematically illustrating a configuration of a visual inspection system according to the embodiment.

As illustrated in FIG. 1, the visual inspection system 1 according to this embodiment includes an operational mechanism 5, a judgment device 110, and a controller 100. The operational mechanism 5 includes a conveyance device 10 conveying an inspection target K and includes a front-surface image capturing device 20, a rear-surface image capturing device 30, a lower-inner-side-surface image capturing device 40, an upper-inner-side-surface image capturing device 50, an outer-side-surface image capturing device 60, a non-defective product collection device 70, a defective product collection device 80, and an uninspected product collection device 90 that are arranged in sequence along the conveying direction of the conveyance device 10. The judgment device 110 and the controller 100 are composed of a computer including a CPU, a RAM, and a ROM.

Conveyance Device

The conveyance device 10 consists of a transparent circular glass plate 11 arranged horizontally and a drive motor 12 rotating the glass plate 11 horizontally. The conveyance device 10 conveys inspection targets K, which are successively fed onto the glass plate 11 from a feed device (not illustrated) disposed on the upstream side, in the rotating direction of the glass plate 11. Note that the inspection target K is, by way of example, an annular molded resin product, such as an O-ring, a gasket, or a packing.

Front-Surface Image Capturing Device

Figure 2:
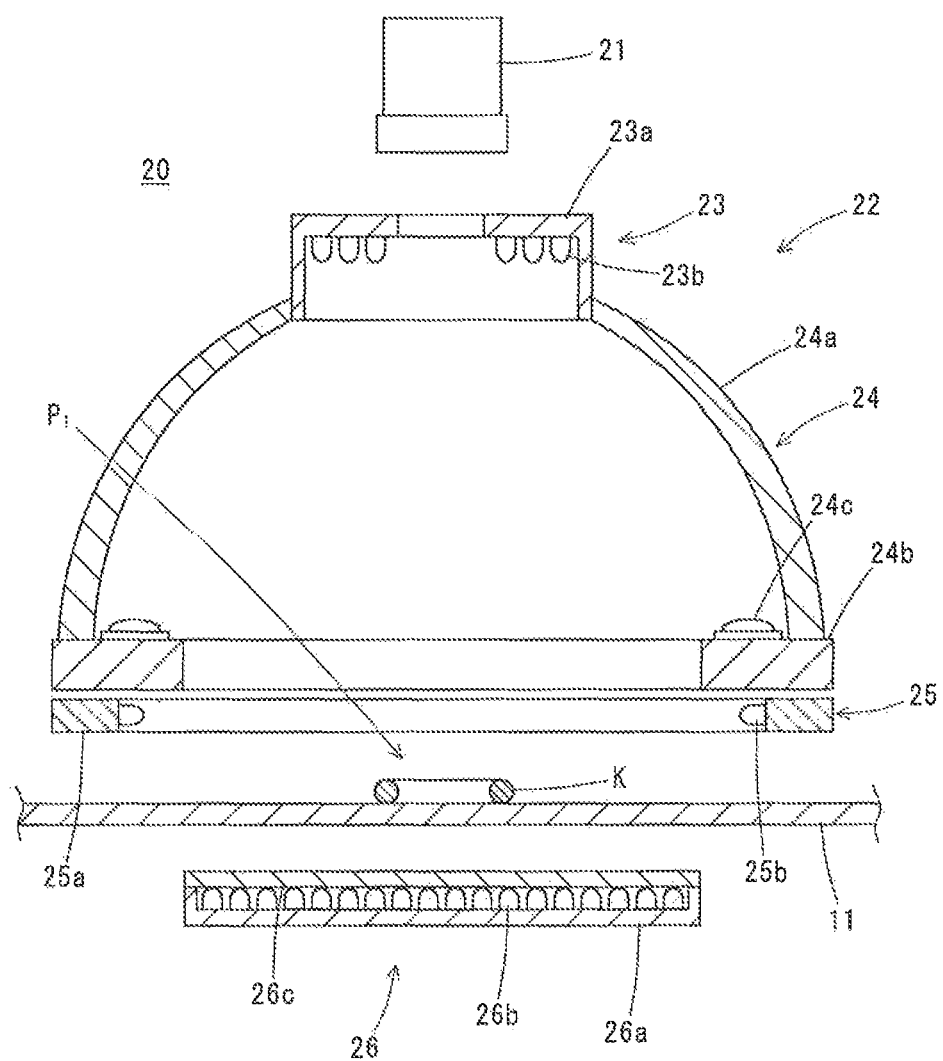
FIG. 2 is a vertical sectional view illustrating principal components of a front-surface image capturing device in the embodiment.

As illustrated in FIG. 2, the front-surface image capturing device 20 has a front-surface imaging camera 21, a front-side blue illumination unit 22, a front-side red illumination unit 25, and a green illumination unit for front surface inspection 26. The front-surface imaging camera 21 is arranged above a front-surface image capturing position $P_1$ set on a conveyance path for the inspection target K and captures a color image of a front surface of the inspection target K present at the front-surface image capturing position $P_1$. Note that the front-surface imaging camera 21 is composed of a typical color camera having a 3-CMOS image sensor.

The front-side blue illumination unit 22 consists of a first front-side blue illumination unit 23 on the upper side and a second front-side blue illumination unit 24 on the lower side that are arranged between the front-surface imaging camera 21 and the glass plate 11 above the front-surface image capturing position $P_1$. The first front-side blue illumination unit 23 consists of a plurality of light projectors 23b and a cup-shaped support 23a. The light projectors 23b are arranged annularly and coaxially with an imaging optical axis of the front-surface imaging camera 21. The support 23a has an opening in each of upper and lower surfaces thereof and supports the light projectors 23b. The light projectors 23b are arranged on the concave bottom of the support 23a and radiate directional blue light toward the front-surface image capturing position $P_1$ located below.

The second front-side blue illumination unit 24 consists of a reflective member 24a, a ring member 24b, and a plurality of light projectors 24c. The reflective member 24a is of a dome shape having a lower end opening and an upper end opening and has a diffuse-reflective surface on an inner surface thereof. The reflective member 24a is connected at the upper end opening to the support 23a. The ring member 24b is arranged at the lower end of the reflective member 24a. The light projectors 24c are arranged annularly on an upper surface of the ring member 24b inside the reflective member 24a and radiate blue light toward the inner surface of the reflective member 24a. The blue light radiated from the light projectors 24c is reflected by the diffuse-reflective surface of the reflective member 24a, and the reflected light travels as non-directional uniform light toward the front-surface image capturing position $P_1$.

The front-side red illumination unit 25 includes a ring-shaped support 25a and a plurality of light projectors 25b. The support 25a is arranged coaxially with the imaging optical axis of the front-surface imaging camera 21 between the second front-side blue illumination unit 24 and the glass plate 11. The light projectors 25b are arranged annularly on an inner peripheral surface of the support 25a and radiate directional red light toward the center of the support 25a. The light radiated from the light projectors 25b mainly illuminates front-side outer and inner peripheral surfaces of the inspection target K present at the front-surface image capturing position $P_1$.

The green illumination unit for front surface inspection 26 is arranged below the glass plate 11 at the front-surface image capturing position $P_1$. The green illumination unit for front surface inspection 26 consists of a plurality of light projectors 26b, a cup-shaped support 26a, and a diffusion plate 26c. The light projectors 26b are arranged planarly in columns and rows and radiate green light upward. The support 26a has an open top and supports the light projectors 26a. The diffusion plate 26c closes the top of the support 26a. The green illumination unit for front surface inspection 26 illuminates the inspection target K present at the front-surface image capturing position $P_1$ with non-directional uniform light from below, and the light functions as backlight for projecting the profile of the inspection target K.

Rear-Surface Image Capturing Device

Figure 4:
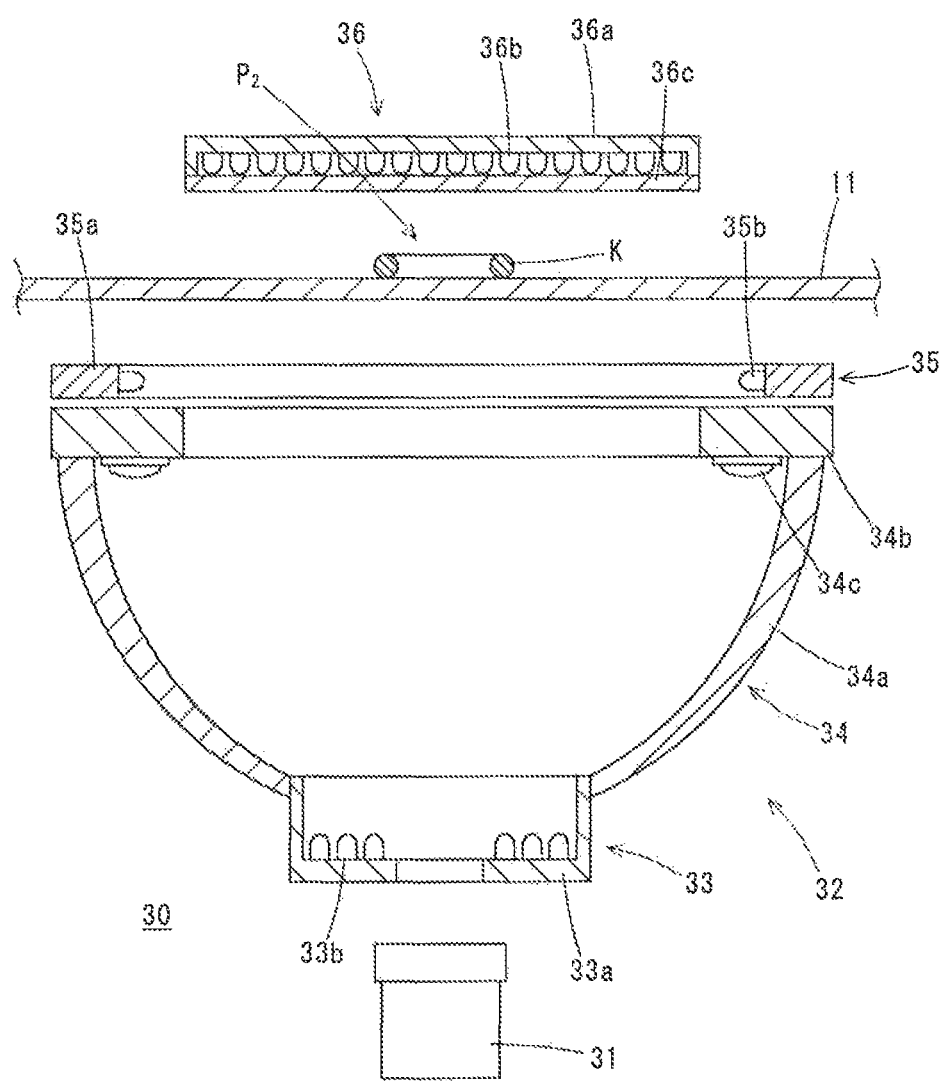
FIG. 4 is a vertical sectional view illustrating principal components of a rear-surface image capturing device in the embodiment.

As illustrated in FIG. 4, the rear-surface image capturing device 30 is configured upside down compared to the front-surface image capturing device 20. The rear-surface image capturing device 30 has a rear-surface imaging camera 31, a rear-side blue illumination unit 32, a rear-side red illumination unit 35, and a green illumination unit for rear surface inspection 36. The rear-surface imaging camera 31 is arranged below a rear-surface image capturing position $P_2$ set on the conveyance path for the inspection target K and captures a color image of a rear surface of the inspection target K present at the rear-surface image capturing position $P_2$. Note that the rear-surface imaging camera 31 is composed of a typical color camera having a 3-CMOS image sensor.

The rear-side blue illumination unit 32 consists of a first rear-side blue illumination unit 33 on the lower side and a second rear-side blue illumination unit 34 on the upper side that are disposed between the rear-surface imaging camera 31 and the glass plate 11 below the rear-surface image capturing position $P_2$. The first rear-side blue illumination unit 33 consists of a plurality of light projectors 33b and a cup-shaped support 33a. The light projectors 33b are arranged annularly and coaxially with an imaging optical axis of the rear-surface imaging camera 31. The support 33a has an opening in each of upper and lower surfaces thereof and supports the light projectors 33b. The light projectors 33b are arranged on the concave bottom of the support 33a and radiate directional blue light toward the rear-surface image capturing position $P_2$ located above.

The second rear-side blue illumination unit 34 consists of a reflective member 34a, a ring member 34b, and a plurality of light projectors 34c. The reflective member 34 is of a reversed dome shape having an upper end opening and a lower end opening and has a diffuse-reflective surface on an inner surface thereof. The reflective member 34a is connected at the lower end opening to the support 33a. The ring member 34b is arranged at the upper end of the reflective member 34a. The light projectors 34c are arranged annularly on a lower surface of the ring member 24b inside the reflective member 34a and radiate blue light toward the inner surface of the reflective member 34a. The blue light radiated from the light projectors 34c is reflected by the diffuse-reflective surface of the reflective member 34a, and the reflected light travels as non-directional uniform light toward the rear-surface image capturing position $P_2$.

The rear-side red illumination unit 35 includes a ring-shaped support 35a and a plurality of light projectors 35b. The support 35a is arranged coaxially with the imaging optical axis of the rear-surface imaging camera 31 between the second rear-side blue illumination unit 34 and the glass plate 11. The light projectors 35b are arranged annularly on an inner peripheral surface of the support 35a and radiate directional red light toward the center of the support 35a. The light radiated from the light projectors 35b mainly illuminates rear-side outer and inner peripheral surfaces of the inspection target K present at rear-surface image capturing position $P_2$.

The green illumination unit for rear surface inspection 36 is arranged above the glass plate 11 at the rear-surface image capturing position $P_2$. The green illumination unit for rear surface inspection 36 consists of a plurality of light projectors 36b, a cup-shaped support 36a, and a diffusion plate 36c. The light projectors 36b are arranged planarly in columns and rows and radiate green light downward. The support 36a has an open bottom and supports the light projectors 36a. The diffusion plate 36c closes the bottom of the support 36a. The green illumination unit for rear surface inspection 36 illuminates the inspection target K present at the rear-surface image capturing position $P_2$ with non-directional uniform light from above, and the light functions as backlight for projecting the profile of the inspection target K.

Lower-Inner-Side-Surface Image Capturing Device

Figure 6:
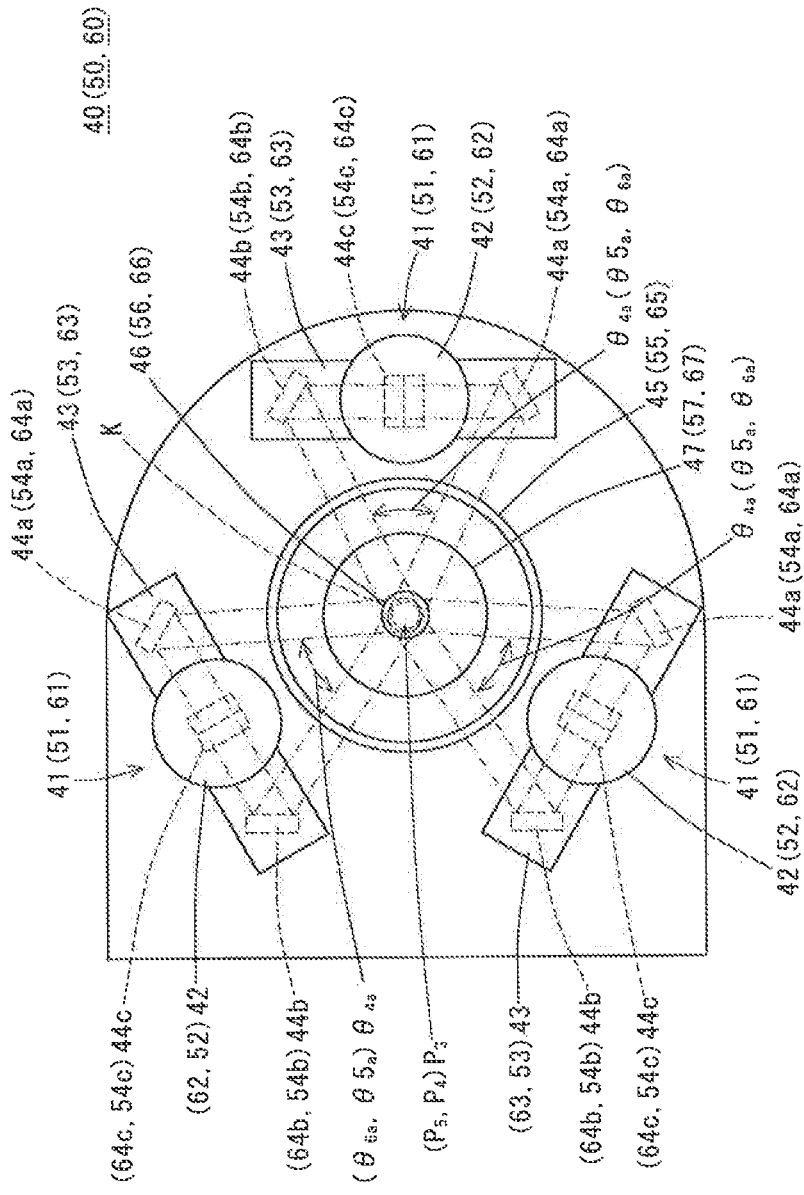
FIG. 6 schematically illustrates an arrangement in a lower-inner-side-surface image capturing device, an upper-inner-side-surface image capturing device, and an outer-side-surface image capturing device, which corresponds to a bottom view of the lower-inner-side-surface image capturing device, a plan view of the upper-inner-side-surface image capturing device, and a plan view of the outer-side-surface image capturing device.
Figure 7:
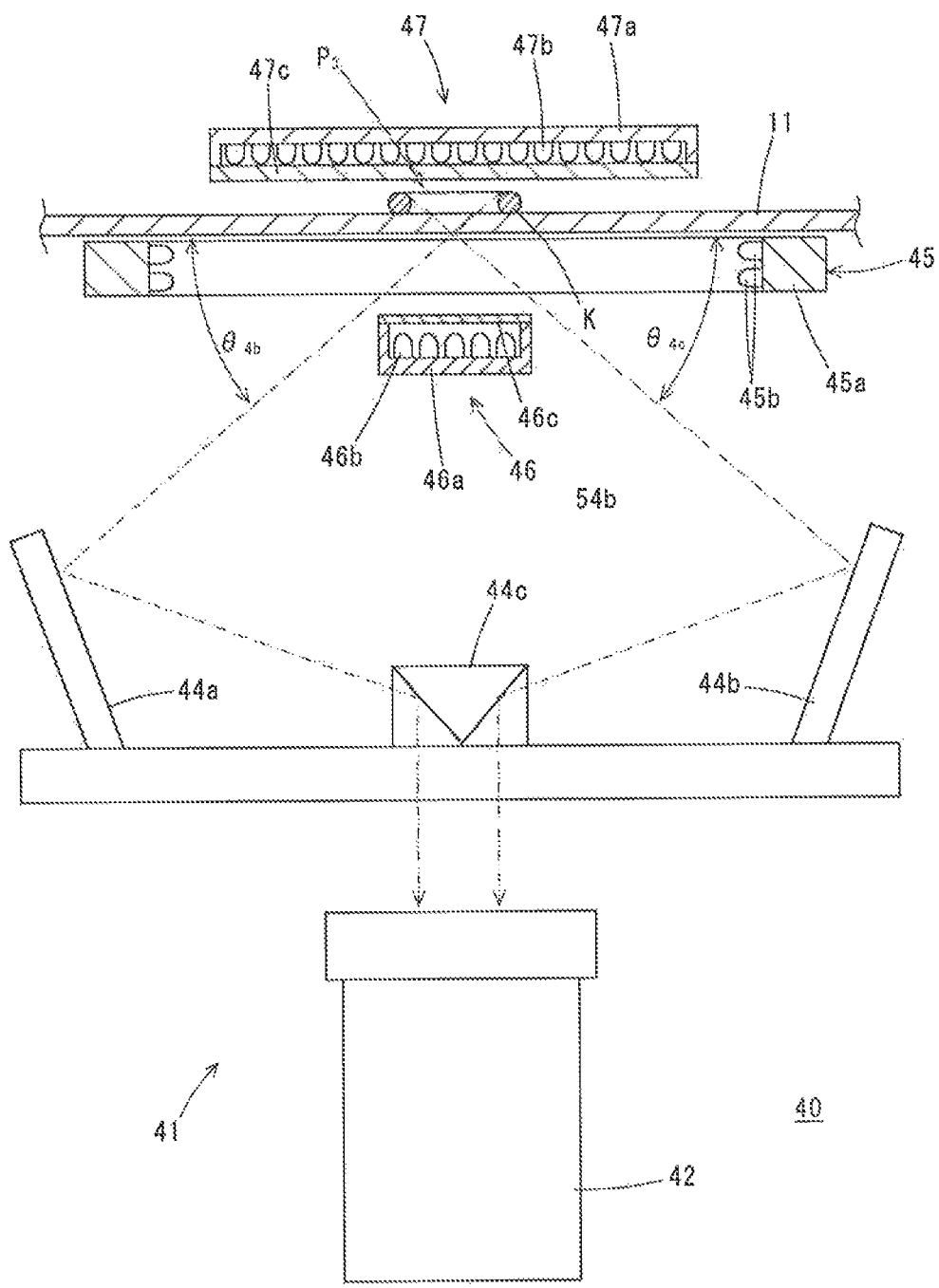
FIG. 7 is an illustrative diagram, partially in section, illustrating principal components of the lower-inner-side-surface image capturing device in the embodiment.

As illustrated in FIGS. 6 and 7, the lower-inner-side-surface image capturing device 40 has three lower-inner-side-surface image capturing units 41, 41, 41, a red illumination unit for lower inner side surface inspection 45, a lower highlighting illumination unit for lower inner side surface 46, and an upper highlighting illumination unit for lower inner side surface 47. Note that, as mentioned above, FIG. 6 schematically illustrates the arrangement in the lower-inner-side-surface image capturing device 40 in bottom view.

The red illumination unit for lower inner side surface inspection 45 is arranged below the glass plate 11 at a lower-inner-side-surface image capturing position $P_3$ set on the conveyance path for the inspection target K. The red illumination unit for lower inner side surface inspection 45 includes a ring-shaped support 45a and a plurality of light projectors 45b. The support 45a is arranged coaxially with a vertical axis passing through the center of the lower-inner-side-surface image capturing position $P_3$. The light projectors 45b are arranged annularly in two upper and low rows on an inner peripheral surface of the support 45a and radiate directional red light toward the center of the support 45a. The light radiated from the light projectors 45b mainly illuminates outer and inner side surfaces of the inspection target K present at the lower-inner-side-surface image capturing position $P_3$.

The lower highlighting illumination unit for lower inner side surface 46 is arranged below the red illumination unit for lower inner side surface inspection 45 at the lower-inner-side-surface image capturing position $P_3$. The lower highlighting illumination unit for lower inner side surface 46 consists of a plurality of light projectors 46b, a cup-shaped support 46a, and a diffusion plate 46c. The light projectors 46b radiate red light toward the lower-inner-side-surface image capturing position $P_3$ located above. The support 46a has an open top and supports the light projectors 46b. The diffusion plate 46c closes the top of the support 46a. The lower highlighting illumination unit for lower inner side surface 46 illuminates the inspection target K present at the lower-inner-side-surface image capturing position $P_3$ with non-directional uniform light from below.

The upper highlighting illumination unit for lower inner side surface 47 is arranged above the glass plate 11 at the lower-inner-side-surface image capturing position $P_3$. The upper highlighting illumination unit for lower inner side surface 47 consists of a plurality of light projectors 47b, a cup-shaped support 47a, and a diffusion plate 47c. The light projectors 47b radiate red light downward. The support 47a has an open bottom and supports the light projectors 47b. The diffusion plate 47c closes the bottom of the support 47a. The upper highlighting illumination unit for lower inner side surface 47 illuminates the inspection target K present at the lower-inner-side-surface image capturing position $P_3$ with non-directional uniform light from above.

The three lower-inner-side-surface image capturing units 41, 41, 41 are arranged around the red illumination unit for lower inner side surface inspection 45 and the lower highlighting illumination unit for lower inner side surface 46 at equal intervals, i.e., at 120° intervals, in the circumferential direction about the vertical axis passing through the center point of the lower-inner-side-surface image capturing position $P_3$.

The lower-inner-side-surface image capturing units 41, 41, 41 have the same configuration. Each lower-inner-side-surface image capturing unit 41 consists of a first mirror 44a, a second mirror 44b, a third mirror 44c, and a lower-inner-side-surface imaging camera 42. The first mirror 44a and the second mirror 44b are arranged with a predetermined spacing therebetween to receive light reflected from a lower inner side surface of the inspection target K at a position below the red illumination unit for lower inner side surface inspection 45. The third mirror 44c has a triangular prism shape and has two reflective surfaces receiving light reflected from the first and second mirrors 44a and 44b and reflecting the light downward. The lower-inner-side-surface imaging camera 42 is arranged below the third mirror 44c and receives light from two optical paths reflected from the third mirror 44c and generates a color image. The first mirror 44a, the second mirror 44b, and the third mirror 44c are supported by an appropriate support 43. The lower-inner-side-surface imaging camera 42 can be composed of a typical color camera having a 3-CMOS image sensor; however, from the aspect of cost and in the light of capturing a single-color image, the lower-inner-side-surface imaging camera 42 may be composed of a monochrome camera.

A light-receiving optical path of the first mirror 44a and a light-receiving optical path of the second mirror 44b form an angle of 60° ($=\theta_{4a}$) with respect to each other about the lower-inner-side-surface image capturing position $P_3$ in a horizontal plane. Further, the light-receiving optical path of the first mirror 44a and the light-receiving optical path of the second mirror 44b are each set to form an angle ($\theta_{4b}$, $\theta_{4c}$) of 39.5° to 40.5° with respect to the horizontal plane.

Upper-Inner-Side-Surface Image Capturing Device

Figure 8:
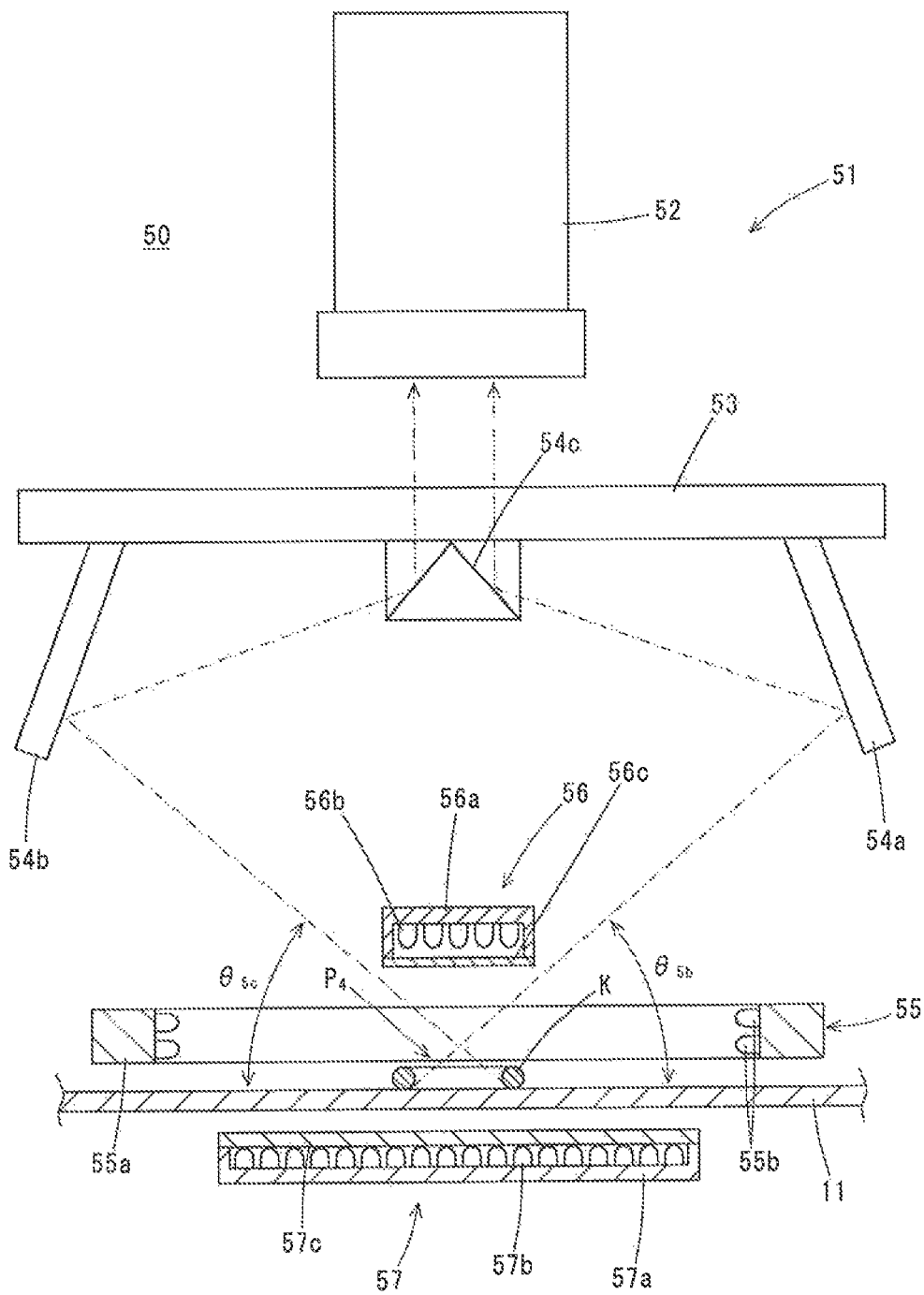
FIG. 8 is an illustrative diagram, partially in section, illustrating principal components of the upper-inner-side-surface image capturing device in the embodiment.

The upper-inner-side-surface image capturing device 50 is configured upside down compared to the lower-inner-side-surface image capturing device 40. As illustrated in FIGS. 6 and 8, the upper-inner-side-surface image capturing device 50 has three upper-inner-side-surface image capturing units 51, 51, 51, a red illumination unit for upper inner side surface inspection 55, an upper highlighting illumination unit for upper inner side surface 56, and a lower highlighting illumination unit for upper inner side surface 57. Note that, as mentioned above, FIG. 6 schematically illustrates the arrangement in the upper-inner-side-surface image capturing device 50 in plan view.

The red illumination unit for upper inner side surface inspection 55 is arranged above the glass plate 11 at an upper-inner-side-surface image capturing position $P_4$ set on the conveyance path for the inspection target K. The red illumination unit for upper inner side surface inspection 55 includes a ring-shaped support 55a and a plurality of light projectors 55b. The support 55a is arranged coaxially with a vertical axis passing through the center of the upper-inner-side-surface image capturing position $P_4$. The light projectors 55b are arranged annularly in two upper and low rows on an inner peripheral surface of the support 55a and radiate directional red light toward the center of the support 55a. The light radiated from the light projectors 55b mainly illuminates the outer and inner side surfaces of the inspection target K present at the upper-inner-side-surface image capturing position $P_4$.

The upper highlighting illumination unit for upper inner side surface 56 is arranged above the red illumination unit for upper inner side surface inspection 55 at the upper-inner-side-surface image capturing position $P_4$. The upper highlighting illumination unit for upper inner side surface 56 consists of a plurality of light projectors 56b, a cup-shaped support 56a, and a diffusion plate 56c. The light projectors 56b radiate red light toward the upper-inner-side-surface image capturing position $P_4$ located below. The support 56a has an open bottom and supports the light projectors 56b. The diffusion plate 56c closes the bottom of the support 56a. The upper highlighting illumination unit for upper inner side surface 56 illuminates the inspection target K present at the upper-inner-side-surface image capturing position $P_4$ with non-directional uniform light from above.

The lower highlighting illumination unit for upper inner side surface 57 is arranged below the glass plate 11 at the upper-inner-side-surface image capturing position $P_4$. The lower highlighting illumination unit for upper inner side surface 57 consists of a plurality of light projectors 57b, a cup-shaped support 57a, and a diffusion plate 57c. The light projectors 57b radiate red light upward. The support 57a has an open top and supports the light projectors 57b. The diffusion plate 57c closes the top of the support 57a. The lower highlighting illumination unit for upper inner side surface 57 illuminates the inspection target K present at the upper-inner-side-surface image capturing position $P_4$ with non-directional uniform light from below.

The three upper-inner-side-surface image capturing units 51, 51, 51 are arranged around the red illumination unit for upper inner side surface inspection 55 and the upper highlighting illumination unit for upper inner side surface 56 at equal intervals, i.e., at 120° intervals, in the circumferential direction about the vertical axis passing through the center point of the upper-inner-side-surface image capturing position $P_4$.

The upper-inner-side-surface image capturing units 51, 51, 51 have the same configuration. Each upper-inner-side-surface image capturing unit 51 consists of a first mirror 54a, a second mirror 54b, a third mirror 54c, and an upper-inner-side-surface imaging camera 52. The first mirror 54a and the second mirror 54b are arranged with a predetermined spacing therebetween to receive light reflected from the upper inner side surface of the inspection target K at a position above the red illumination unit for upper inner side surface inspection 55. The third mirror 54c has a triangular prism shape and has two reflective surfaces receiving light reflected from the first and second mirrors 54a and 54b and reflecting the light upward. The upper-inner-side-surface imaging camera 52 is arranged above the third mirror 54c and receives light from two optical paths reflected from the third mirror 54c and generates a color image. The first mirror 54a, the second mirror 54b, and the third mirror 54c are supported by an appropriate support 53. The upper-inner-side-surface imaging camera 52 can be composed of a typical color camera having a 3-CMOS image sensor; however, from the aspect of cost and in the light of capturing a single-color image, the upper-inner-side-surface imaging camera 52 may be composed of a monochrome camera.

A light-receiving optical path of the first mirror 54a and a light-receiving optical path of the second mirror 54b form an angle of 60° ($=\theta_{5a}$) with respect to each other about the upper-inner-side-surface image capturing position $P_4$ in a horizontal plane. Further, the light-receiving optical path of the first mirror 54a and the light-receiving optical path of the second mirror 54b are each set to form an angle ($\theta_{5b}, \theta_{5c}$) of 39.5° to 40.5° with respect to the horizontal plane.

Outer-Side-Surface Image Capturing Device

Figure 9:
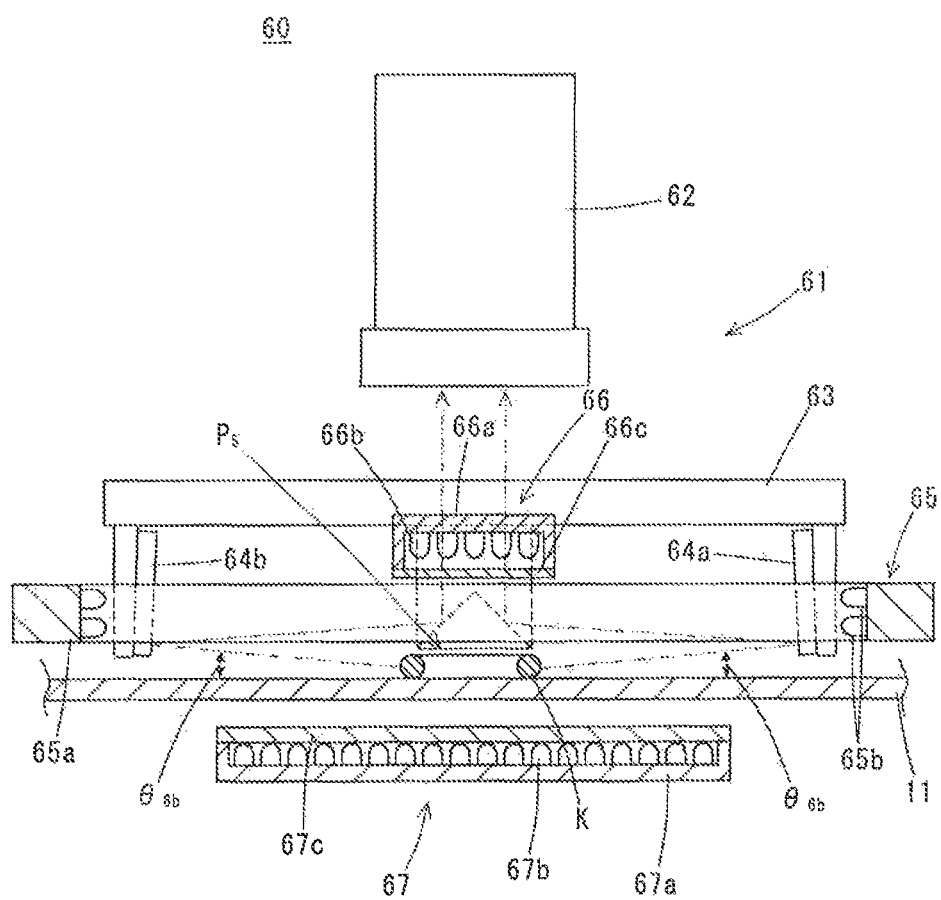
FIG. 9 is an illustrative diagram, partially in section, illustrating principal components of the outer-side-surface image capturing device in the embodiment.

As illustrated in FIGS. 6 and 9, the outer-side-surface image capturing device 60 has three outer-side-surface image capturing units 61, 61, 61, a red illumination unit for outer side surface inspection 65, an upper highlighting illumination unit for outer side surface 66, and a lower highlighting illumination unit for outer side surface 67. Note that, as mentioned above, FIG. 6 schematically illustrates the arrangement in the outer-side-surface image capturing device 60 in plan view.

The red illumination unit for outer side surface inspection 65 is arranged above the glass plate 11 at an outer-side-surface image capturing position $P_5$ set on the conveyance path for the inspection target K. The red illumination unit for outer side surface inspection 65 includes a ring-shaped support 65a and a plurality of light projectors 65b. The support 65a is arranged coaxially with a vertical axis passing through the center of the outer-side-surface image capturing position $P_5$. The light projectors 65b are arranged annularly in two upper and low rows on an inner peripheral surface of the support 65a and radiate directional red light toward the center of the support 65a. The light radiated from the light projectors 65b mainly illuminates the outer and inner side surfaces of the inspection target K present at the outer-side-surface image capturing position $P_5$.

The upper highlighting illumination unit for outer side surface 66 is arranged above the red illumination unit for outer side surface inspection 65 at the outer-side-surface image capturing position $P_5$. The upper highlighting illumination unit for outer side surface 66 consists of a plurality of light projectors 66b, a cup-shaped support 66a, and a diffusion plate 66c. The light projectors 66b radiate red light toward the outer-side-surface image capturing position $P_5$ located below. The support 66a has an open bottom and supports the light projectors 66b. The diffusion plate 66c closes the bottom of the support 66a. The upper highlighting illumination unit for outer side surface 66 illuminates the inspection target K present at the outer-side-surface image capturing position $P_5$ with non-directional uniform light from above.

The lower highlighting illumination unit for outer side surface 67 is arranged below the glass plate 11 at the outer-side-surface image capturing position $P_5$. The lower highlighting illumination unit for outer side surface 67 consists of a plurality of light projectors 67b, a cup-shaped support 67a, and a diffusion plate 67c. The light projectors 67b radiate red light upward. The support 67a has an open top and supports the light projectors 67b. The diffusion plate 67c closes the top of the support 67a. The lower highlighting illumination unit for outer side surface 67 illuminates the inspection target K present at the outer-side-surface image capturing position $P_5$ with non-directional uniform light from below.

The three outer-side-surface image capturing units 61, 61, 61 are arranged around the red illumination unit for outer side surface inspection 65 and the upper highlighting illumination unit for outer side surface 66 at equal intervals, i.e., at 120° intervals, in the circumferential direction about the vertical axis passing through the center point of the outer-side-surface image capturing position $P_5$.

The outer-side-surface image capturing units 61, 61, 61 have the same configuration. Each outer-side-surface image capturing unit 61 consists of a first mirror 64a, a second mirror 64b, a third mirror 64c, and an outer-side-surface imaging camera 62. The first mirror 64a and the second mirror 64b are arranged with a predetermined spacing therebetween to receive light reflected from the outer side surface of the inspection target K at position below the red illumination unit for outer side surface inspection 65. The third mirror 64c has a triangular prism shape and has two reflective surfaces receiving light reflected from the first and second mirrors 64a and 64b and reflecting the light upward. The outer-side-surface imaging camera 62 is arranged above the third mirror 64c and receives light from two optical paths reflected from the third mirror 64c and generates a color image. The first mirror 64a, the second mirror 64b, and the third mirror 64c are supported by an appropriate support 63. The outer-side-surface imaging camera 62 can be composed of a typical color camera having a 3-CMOS image sensor; however, from the aspect of cost and in the light of capturing a single-color image, the outer-side-surface imaging camera 62 may be composed of a monochrome camera.

A light-receiving optical path of the first mirror 64a and a light-receiving optical path of the second mirrors 64b form an angle of 60° (=$\theta_{6a}$) with respect to each other about the outer-side-surface image capturing position $P_5$ in a horizontal plane. Further, the light-receiving optical path of the first mirror 64a and the light-receiving optical path of the second mirror 64b are each set to form an angle ($\theta_{6b}$, $\theta_{6c}$) of 3.5° to 4.5° with respect to the horizontal plane.

Non-Defective Product Collection Device, Defective Product Collection Device, and Uninspected Product Collection Device The non-defective product collection device 70, the defective product collection device 80, and the uninspected product collection device 90 each have a nozzle and a collection box. The nozzle ejects compressed air in a direction radially outward from the center of the glass plate 11, and an inspection target K blown radially outward by the flow of compressed air ejected by the nozzle is collected into the collection box. Under control by the controller 100, the non-defective product collection device 70 collects an inspection target K judged as non-defective, the defective product collection device 80 collects an inspection target K judged as defective, and the uninspected product collection device 90 collects an inspection target K judged as uninspected.

Judgment Device

The judgment device 110 processes images captured by the front-surface image capturing device 20, the rear-surface image capturing device 30, the lower-inner-side-surface image capturing device 40, the upper-inner-side-surface image capturing device 50, and the outer-side-surface image capturing device 60 to determine, for example, based on the luminance levels of the captured images, whether or not a dent or scratch is present on the inspection target K and determine based on the profile shapes of the captured images whether or not a burr is present on the inspection target K. Where neither a dent or scratch nor a burr is present on the inspection target K, the judgment device 110 judges the inspection target K as non-defective. Where a dent or scratch or a burr is present on the inspection target K, the judgment device 110 judges the inspection target K as defective. The judgement device 110 transmits the judgment result to the controller 100.

Controller

The controller 100 operationally controls the conveyance device 10, the front-surface image capturing device 20, the rear-surface image capturing device 30, the lower-inner-side-surface image capturing device 40, the upper-inner-side-surface image capturing device 50, and the outer-side-surface image capturing device 60 and operationally controls the non-defective product collection device 70, the defective product collection device 80, and the uninspected product collection device 90 in accordance with the judgment result transmitted from the judgment device 110.

The visual inspection system 1 according to this embodiment having the above-described configuration inspects the appearance of an annular resin product as an inspection target K in the following manner.

That is to say, inspection targets K are successively fed onto the glass plate 11 of the conveyance device 10 from an appropriate feed device (not illustrated) disposed on the upstream side. Each inspection target K is conveyed in the rotating direction of the glass plate 11 (indicated by the arrow in FIG. 1) to pass through the front-surface image capturing device 20, the rear-surface image capturing device 30, the lower-inner-side-surface image capturing device 40, the upper-inner-side-surface image capturing device 50, and the outer-side-surface image capturing device 60 in sequence.

In this process, images of the front surface, rear surface, lower inner side surface, upper inner side surface, and outer side surface of the inspection target K are respectively captured in the front-surface image capturing device 20, the rear-surface image capturing device 30, the lower-inner-side-surface image capturing device 40, the upper-inner-side-surface image capturing device 50, and the outer-side-surface image capturing device 60. The captured images are transmitted to the judgment device 110.

Specifically, in the front-surface image capturing device 20, a color image of the front surface of the inspection target K is captured by the front-surface imaging camera 21 at the front-surface image capturing position P1 with the inspection target K illuminated by the front-side blue illumination unit 22 consisting of the first front-side blue illumination unit 23 and the second front-side blue illumination unit 24, the front-side red illumination unit 25, and the green illumination unit for front surface inspection 26.

Figure 3:
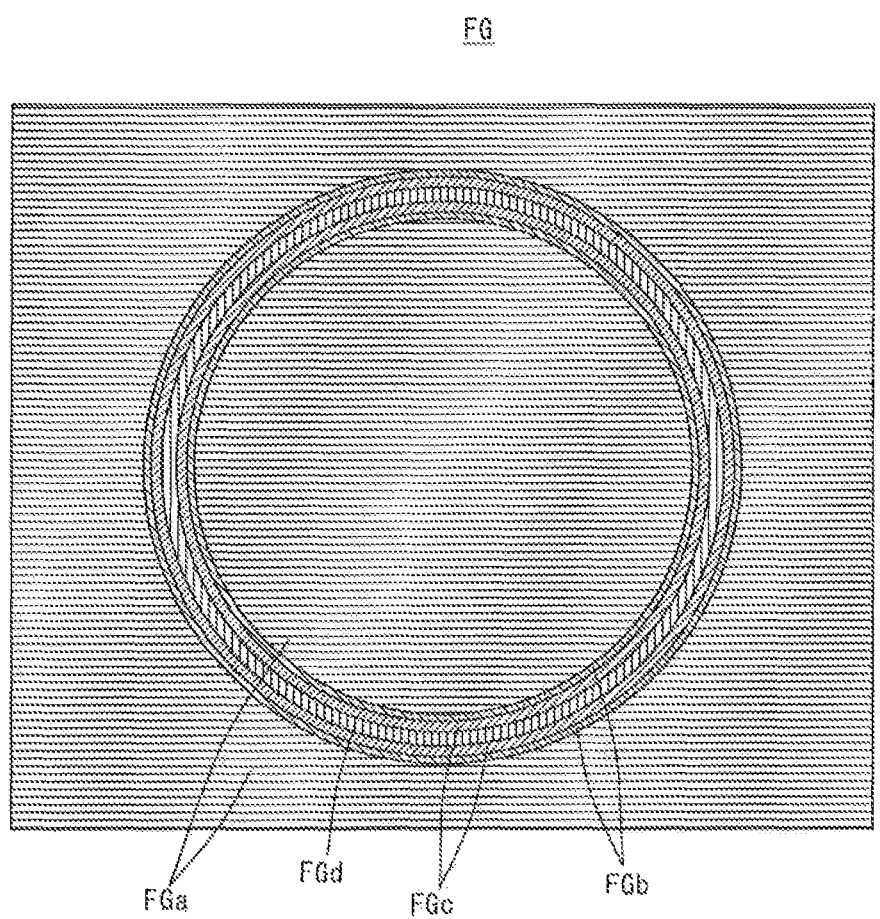
FIG. 3 is an illustrative diagram illustrating an image captured in the front-surface image capturing device in the embodiment.

That is to say, directional blue light is radiated onto the upper surface of the inspection target K by the first front-side blue illumination unit 23 and diffused blue light is radiated onto the upper surface of the inspection target K by the second front-side blue illumination unit 24, so that the upper surface of the inspection target K is illuminated with these lights. Further, directional red light is radiated onto the front-side outer and inner peripheral surfaces of the inspection target K by the front-side red illumination unit 25. Furthermore, green light as backlight is radiated toward the inspection target K from below by the green illumination unit for front surface inspection 26. The thus-illuminated inspection target K is imaged by the front-surface imaging camera 21, so that a color image FG with the background FGa in green, the outer and inner peripheral portions FGb in red, and the upper surface portions FGc and FGd in blue as illustrated in FIG. 3 is obtained.

Blue light is likely to be scattered. Therefore, blue light reflected from the inspection target K will be small in amount. Red light is unlikely to be scattered. Therefore, red light reflected from the inspection target K will be large in amount. On the other hand, because of the shape characteristic of the inspection target K, there are tendencies that the front-side outer and inner peripheral surfaces of the inspection target K do not provide much reflected light and the front surface, i.e., the surface other than the outer and inner peripheral surfaces, of the inspection target K provides much reflected light.

Accordingly, as described above, red light that is unlikely to be scattered is radiated onto the outer and inner peripheral surfaces of the inspection target K that do not provide much reflected light, so that reflected light in an amount appropriate for detection of a dent or scratch present on the outer and inner peripheral surfaces is led to the front-surface imaging camera 21. Further, blue light that is likely to be scattered is radiated onto the front surface of the inspection target K that provides much reflected light, so that reflected light in an amount appropriate for detection of a dent or scratch present on the front surface is led to the front-surface imaging camera 21. Further, light of a color other than blue and red, namely green light, is used as backlight, so that the profile of the inspection target K is projected. Therefore, if a burr is present on the outer peripheral surface or inner peripheral surface of the inspection target K, the shape of the burr is projected as part of the profile of the inspection target K.

Thus, in the front-surface image capturing device 20, where a dent or scratch is present on the front surface of the inspection target K, an image with the dent or scratch highlighted is obtained, while where a burr is present on the outer peripheral surface or inner peripheral surface of the inspection target K, an image with the burr highlighted is obtained. The judgment device 110 determines based on such an image whether or not a defect such as a dent or scratch or a burr is present on the front surface of the inspection target K, which achieves highly precise judgment.

In the rear-surface image capturing device 30, similarly to the front-surface image capturing device 20, a color image of the rear surface of the inspection target K is captured by the rear-surface imaging camera 31 at the rear-surface image capturing position $P_2$ with the inspection target K illuminated by the rear-side blue illumination unit 32 consisting of the first rear-side blue illumination unit 33 and the second rear-side blue illumination unit 34, the rear-side red illumination unit 35, and the green illumination unit for rear surface inspection 36.

Figure 5:
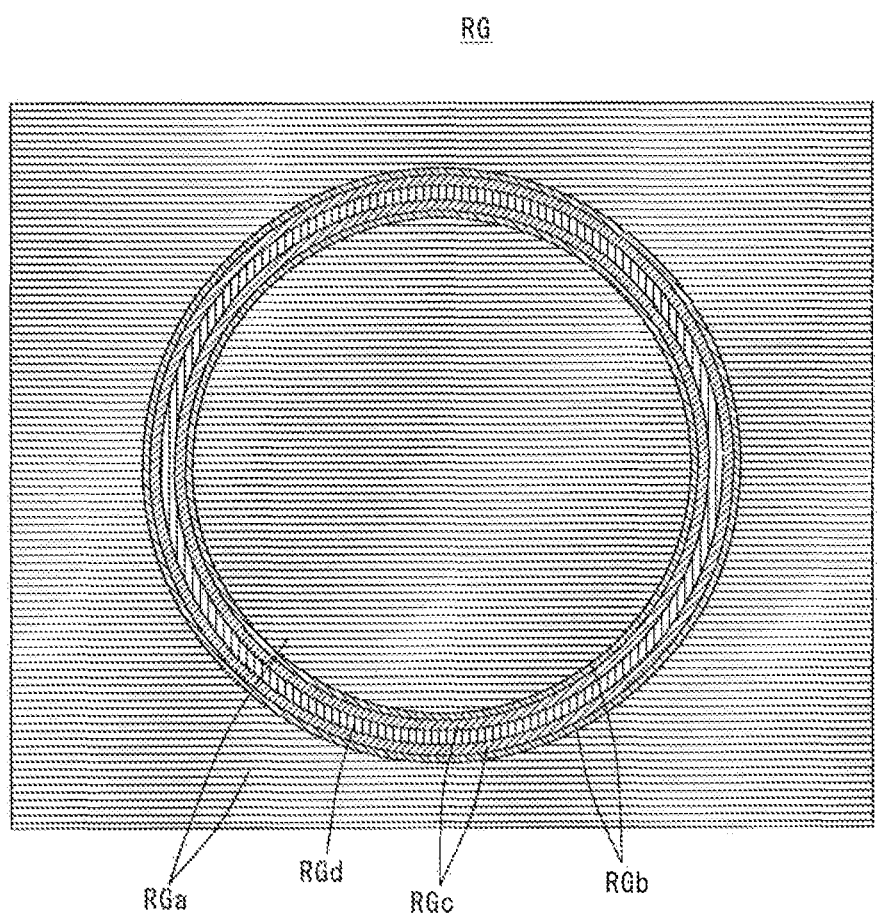
FIG. 5 is an illustrative diagram illustrating an image captured in the rear-surface image capturing device in the embodiment.

That is to say, directional blue light is radiated onto the lower surface of the inspection target K by the first rear-side blue illumination unit 33 and diffused blue light is radiated onto the lower surface of the inspection target K by the second rear-side blue illumination unit 24, so that the lower surface of the inspection target K is illuminated with these lights. Further, directional red light is radiated onto the rear-side outer and inner peripheral surfaces of the inspection target K by the rear-side red illumination unit 35. Furthermore, green light as backlight is radiated toward the inspection target K from above by the green illumination unit for rear surface inspection 36. The thus-illuminated inspection target K is imaged by the rear-surface imaging camera 31, so that a color image RG with the background RGa in green, the outer and inner peripheral portions RGb in red, and the lower surface portions RGc and RGd in blue as illustrated in FIG. 5 is obtained.

As described above, red light that is unlikely to be scattered is radiated onto the outer and inner peripheral surfaces of the inspection target K that do not provide much reflected light, so that reflected light in an amount appropriate for detection of a dent or scratch present on the outer and inner peripheral surfaces is led to the rear-surface imaging camera 31. Further, blue light that is likely to be scattered is radiated onto the rear surface, i.e., the surface other than the outer and inner peripheral surfaces, of the inspection target K that provides much reflected light, so that reflected light in an amount appropriate for detection of a dent or scratch present on the rear surface is led to the rear-surface imaging camera 31. Further, light of a color other than blue and red, namely green light, is used as backlight, so that the profile of the inspection target K is projected. Therefore, if a burr is present on the outer peripheral surface or inner peripheral surface of the inspection target K, the shape of the burr is projected as part of the profile of the inspection target K.

Thus, in the rear-surface image capturing device 30, where a dent or scratch is present on the rear surface of the inspection target K, an image with the dent or scratch highlighted is obtained, while where a burr is present on the outer peripheral surface or inner peripheral surface of the inspection target K, an image with the burr highlighted is obtained. The judgment device 110 determines based on such an image whether or not a defect such as a dent or scratch or a burr is present on the rear surface of the inspection target K, which achieves highly precise judgment.

In the lower-inner-side-surface image capturing device 40, at the lower-inner-side-surface image capturing position $P_3$, directional red light is radiated onto the outer and inner side surfaces of the inspection target K by the red illumination unit for lower inner side surface inspection 45, diffused uniform red light is radiated onto the lower outer and inner side surfaces of the inspection target K by the lower highlighting illumination unit for lower inner side surface 46, and diffused uniform red light is radiated onto the upper outer and inner side surfaces of the inspection target K by the upper highlighting illumination unit for lower inner side surface 47.

Reflected light from the lower inner side surface of the thus-illuminated inspection target K follows the optical paths formed by the first and second mirrors 44a and 44b and third mirrors 44c of the three lower-inner-side-surface image capturing units 41, 41, 41 arranged at equal intervals in the circumferential direction, and respectively enter the lower-inner-side-surface imaging cameras 42. Each lower-inner-side-surface imaging camera 42 forms, in one frame, images from two paths, i.e., two images from two different directions, mainly showing the lower inner side surface of the inspection target K, and transmits the formed images to the judgment device 110. Accordingly, six images from six different directions captured by the lower-inner-side-surface imaging cameras 42, 42, 42 and showing the lower inner side surface of the inspection target K are transmitted to the judgment device 110. Thus, the lower inner side surface of the inspection target K is imaged from six directions; therefore, images are obtained which cover a broader area of the lower inner side surface of the inspection target K than those in the conventional art. Based on these images covering a broader area, the appearance judgment is carried out. Thus, judgment whether the inspection target K is defective in appearance or not is carried out with respect to a broader area of the lower inner side surface of the inspection target K than in the conventional art.

Further, the light-receiving optical path of the first mirror 44a and the light-receiving optical path of the second mirror 44b in each lower-inner-side-surface image capturing unit 41 form an angle of 60° with respect to each other about the lower-inner-side-surface image capturing position $P_3$ in a horizontal plane, and the light-receiving optical path of the first mirror 44a and the light-receiving optical path of the second mirror 44b are each set to form an angle of 39.5° to 40.5° with respect to the horizontal plane. Therefore, the entire periphery of the lower inner side surface of the inspection target K is imaged uniformly and images are captured which cover the lower area of the inner side surface of the inspection target K to the utmost extent.

Further, in the lower-inner-side-surface image capturing device 40, red light that is unlikely to be scatted when reflected is used as illumination light and this red light is radiated onto the lower inner side surface of the inspection target K. Therefore, a sufficient amount of reflected light from the lower inner side surface of the inspection target K is led to each lower-inner-side-surface imaging camera 42.

In the upper-inner-side-surface image capturing device 50, at the upper-inner-side-surface image capturing position $P_4$, directional red light is radiated onto the outer and inner side surfaces of the inspection target K by the red illumination unit for upper inner side surface inspection 55, diffused uniform red light is radiated onto the upper outer and inner side surfaces of the inspection target K by the upper highlighting illumination unit for upper inner side surface 56, and diffused uniform red light is radiated onto the lower outer and inner side surfaces of the inspection target K by the lower highlighting illumination unit for upper inner side surface 57.

Reflected light from the upper inner side surface of the thus-illuminated inspection target K follow the optical paths formed by the first and second mirrors 54a and 54b and third mirrors 54c of the three upper-inner-side-surface image capturing units 51, 51, 51 arranged at equal intervals in the circumferential direction, and respectively enter the upper-inner-side-surface imaging cameras 52. Each upper-inner-side-surface imaging camera 52 forms, in one frame, images from two paths, i.e., two images from two different directions, mainly showing the upper inner side surface of the inspection target K, and transmits the formed images to the judgment device 110. Accordingly, six images from six different directions captured by the upper-inner-side-surface imaging cameras 42, 42, 42 and showing the upper inner side surface of the inspection target K are transmitted to the judgment device 110. Thus, the upper inner side surface of the inspection target K is imaged from six directions; therefore, images are obtained which cover a broader area of the upper inner side surface of the inspection target K than those in the conventional art. Based on these images covering a broader area, the appearance judgment is carried out. Thus, judgment whether the inspection target K is defective in appearance or not is carried out with respect to a broader area of the upper inner side surface of the inspection target K than in the conventional art.

Further, the light-receiving optical path of the first mirror 54a and the light-receiving optical path of the second mirror 54b in each upper-inner-side-surface image capturing unit 51 form an angle of 60° with respect to each other about the upper-inner-side-surface image capturing position $P_4$ in a horizontal plane, and the light-receiving optical path of the first mirror 54a and the light-receiving optical path of the second mirror 54b are each set to form an angle of 39.5° to 40.5° with respect to the horizontal plane. Therefore, the entire periphery of the upper inner side surface of the inspection target K is imaged uniformly and images are captured which cover the upper area of the inner side surface of the inspection target K to the utmost extent.

Further, in the upper-inner-side-surface image capturing device 50, red light that is unlikely to be scatted when reflected is used as illumination light and this red light is radiated onto the upper inner side surface of the inspection target K. Therefore, a sufficient amount of reflected light from the upper inner side surface of the inspection target K is led to each upper-inner-side-surface imaging camera 52.

In the outer-side-surface image capturing device 60, at the outer-side-surface image capturing position $P_5$, directional red light is radiated onto the outer and inner side surfaces of the inspection target K by the red illumination unit for outer side surface inspection 65, diffused uniform red light is radiated onto the upper outer and inner side surfaces of the inspection target K by the upper highlighting illumination unit for outer side surface 66, and diffused uniform red light is radiated onto the lower outer and inner side surfaces of the inspection target K by the lower highlighting illumination unit for outer side surface 67.

Reflected light from the outer side surface of the thus-illuminated inspection target K follow the optical paths formed by the first and second mirrors 64a and 64b and third mirrors 64c of the three outer-side-surface image capturing units 61, 61, 61 arranged at equal intervals in the circumferential direction, and respectively enter the outer-side-surface imaging cameras 62. Each outer-side-surface imaging camera 62 forms, in one frame, images from two paths, i.e., two images from two different directions, mainly showing the outer side surface of the inspection target K, and transmits the formed images to the judgment device 110. Accordingly, six images from six different directions captured by the outer-side-surface imaging cameras 62, 62, 62 and showing the outer side surface of the inspection target K are transmitted to the judgment device 110. Thus, the outer side surface of the inspection target K is imaged from six directions; therefore, images are obtained which cover a broader area of the outer side surface of the inspection target K than those in the conventional art. Based on these images covering a broader area, the appearance judgement is carried out. Thus, judgment whether the inspection target K is defective in appearance or not is carried out with respect to a broader area of the outer side surface of the inspection target K than in the conventional art.

Further, the light-receiving optical path of the first mirror 64a and the light-receiving optical path of the second mirror 64b in each outer-side-surface image capturing unit 61 form an angle of 60° with respect to each other about the outer-side-surface image capturing position $P_5$ in a horizontal plane, and the light-receiving optical path of the first mirror 64a and the light-receiving optical path of the second mirror 64b are each set to form an angle of 3.5° to 4.5° with respect to the horizontal plane. Therefore, the entire periphery of the outer side surface of the inspection target K is imaged uniformly and images are captured which cover the lower area of the outer side surface of the inspection target K to the utmost extent.

Further, in the outer-side-surface image capturing device 60, red light that is unlikely to be scatted when reflected is used as illumination light and this red light is radiated onto the outer side surface of the inspection target K. Therefore, a sufficient amount of reflected light from the outer side surface of the inspection target K is led to each outer-side-surface imaging camera 62.

As described above, the judgment device 110 judges based on the images captured in the front-surface image capturing device 20, the rear-surface image capturing device 30, the lower-inner-side-surface image capturing device 40, the upper-inner-side-surface image capturing device 50, and the outer-side-surface image capturing device 60 whether a defect is present on the inspection target K, and transmits the judgment result to the controller 100. The controller 100 receives the judgment result and operates as follows: where no defect is detected on the inspection target K, the controller 100 drives the non-defective product collection device 70 at the timing when the inspection target K reaches the non-defective product collection device 70, thereby collecting the inspection target K into the non-defective product collection device 70; where a defect is detected on the inspection target K, the controller 100 drives the defective product collection device 80 at the timing when the inspection target K reaches the defective product collection device 80, thereby collecting the inspection target K into the defective product collection device 80; and where the inspection target K is judged as uninspected, the controller 100 drives the uninspected product collection device 90 at the timing when the inspection target K reaches the uninspected product collection device 90, thereby collecting the inspection target K into the uninspected product collection device 90.

As described in detail above, the visual inspection system 1 according to this embodiment is configured to capture images covering broader areas of the outer and inner side surfaces of the inspection target than those in the conventional art and carry out the appearance judgment based on the images. Therefore, judgment whether the inspection target is defective in appearance or not is carried out with respect to broader areas of the outer and inner side surfaces of the inspection target than in the conventional art.

Figure 10:
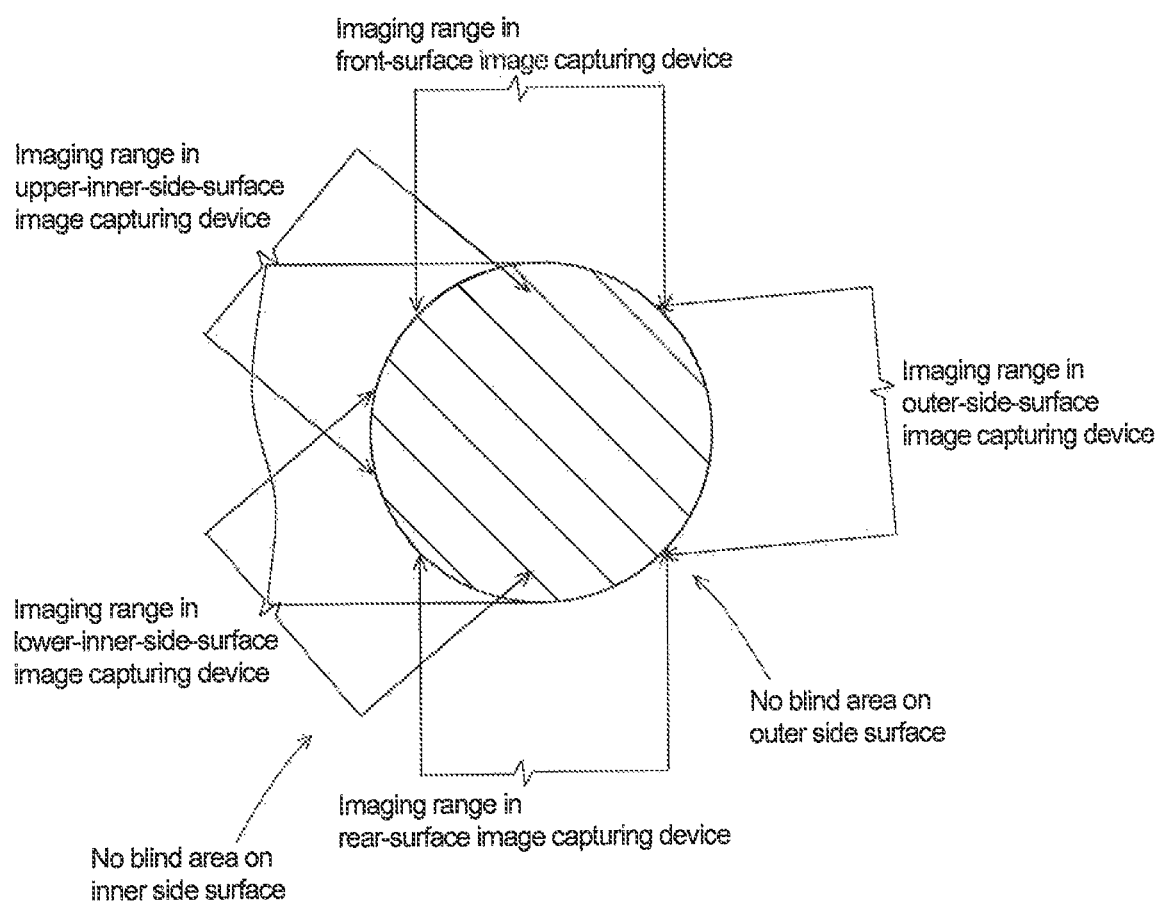
FIG. 10 is an illustrative diagram illustrating an advantageous effect of the visual inspection system according to the embodiment.
Figure 11:
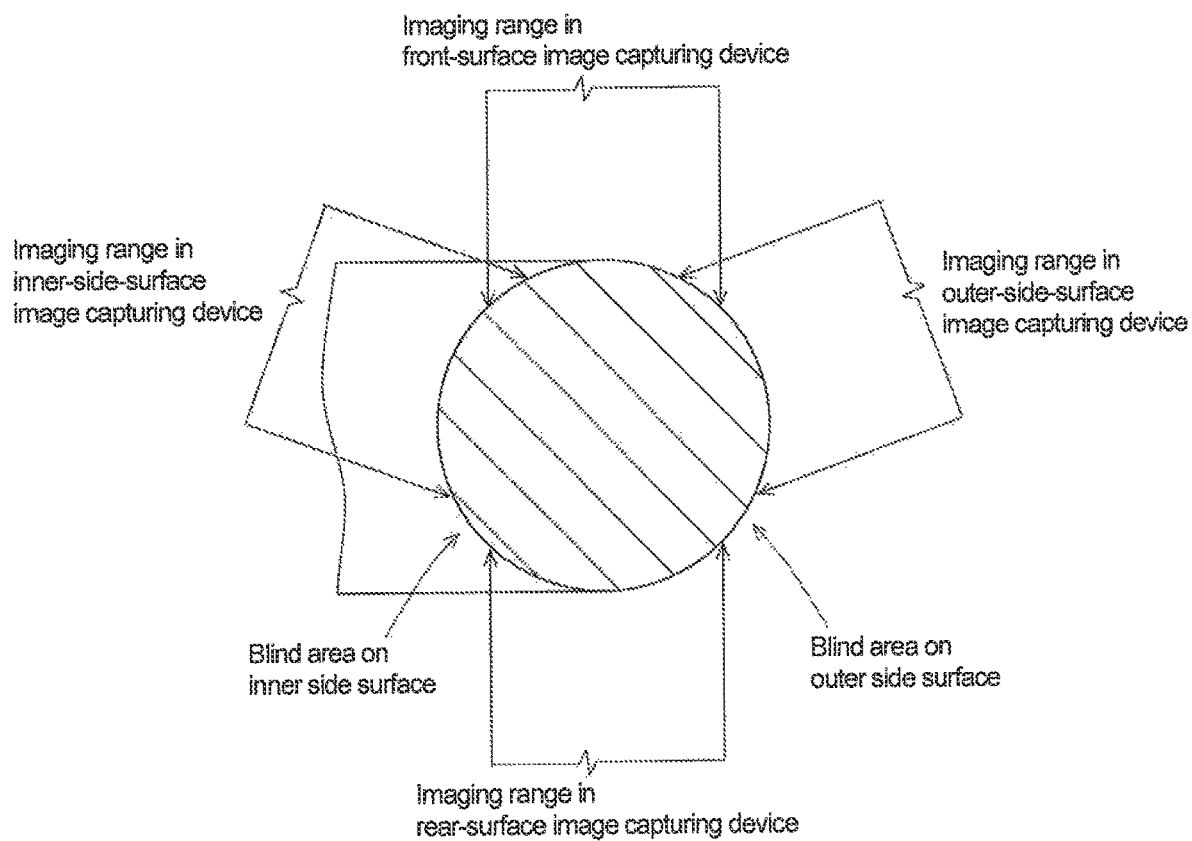
FIG. 11 is an illustrative diagram illustrating a problem in the conventional visual inspection system.

Further, the visual inspection system 1 according to this embodiment is configured to capture images of the inspection target K in the front-surface image capturing device 20, the rear-surface image capturing device 30, the lower-inner-side-surface image capturing device 40, the upper-inner-side-surface image capturing device 50, and the outer-side-surface image capturing device 60. Therefore, the entire surface of the inspection target K is imaged, which achieves blind-area-free appearance inspection (see FIG. 10).

Furthermore, the visual inspection system 1 according to this embodiment is capable of precisely detecting defects such as a dent or scratch and a burr present on the front and rear surfaces, inclusive of the outer and inner peripheral surfaces, of the inspection target, i.e., an annular resin product, and classifying the inspection target. Illuminating the inspection target with white light has difficulty in detecting a dent or scratch, particularly when the inspection target is a dark or black molded resin product. With the visual inspection system 1 according to this embodiment, the presence or absence of a dent or scratch is precisely detected even when the inspection target is a dark or black molded resin product.

Above has been described embodiments of the present disclosure. However, it should be understood that the present disclosure is not limited to the above-described embodiment and can be implemented in other manners.

What is claimed is:

1. A visual inspection system inspecting an appearance of an annular resin product as an inspection target, comprising at least:
   a conveyance device having a transparent circular glass plate arranged horizontally, and rotating the glass plate horizontally to convey the inspection target fed on the glass plate in a rotating direction of the glass plate;
   an outer-side-surface image capturing device capturing an image of an outer side surface of the inspection target being conveyed by the conveyance device at an outer-side-surface image capturing position set on a conveyance path for the inspection target; and
   a judgment device processing the image captured by the outer-side-surface image capturing device to judge whether the inspection target is defective in appearance or not, wherein:
   the outer-side-surface image capturing device comprises:
   a red illumination unit for outer side surface inspection arranged above the glass plate at the outer-side-surface image capturing position; and
   first, second, and third outer-side-surface image capturing units arranged around the red illumination unit for outer side surface inspection at equal intervals in a circumferential direction about a vertical axis passing through a center point of the outer-side-surface image capturing position;
   the red illumination unit for outer side surface inspection includes an annular light projector arranged coaxially with the vertical axis and radiating red light mainly toward a center of the red illumination unit for outer surface inspection to mainly illuminate the outer side surface of the annular resin product present at the outer-side-surface image capturing position; and
   each of the first, second, and third outer-side-surface image capturing units includes:
   first and second mirrors arranged with a predetermined spacing therebetween to receive light reflected from the outer side surface of the inspection target at a position below the red illumination unit for outer side surface inspection;
   a third mirror having two reflective surfaces receiving light reflected from the first and second mirrors and reflecting the light upward; and
   an outer-side-surface imaging camera arranged above the third mirror and receiving light from two optical paths reflected from the third mirror and generate a color image.

2. The visual inspection system according to claim 1, wherein a light-receiving optical path of the first mirror and a light-receiving optical path of the second mirror of each of the first, second, and third outer-side-surface image capturing units form an angle of 60° with respect to each other about the outer-side-surface image capturing position in a horizontal plane.

3. The visual inspection system according to claim 2, wherein the light-receiving optical path of the first mirror and the light-receiving optical path of the second mirror of each of the first, second, and third outer-side-surface image capturing units form an angle of 3.5° to 4.5° with respect to the horizontal plane.

4. The visual inspection system according to claim 3, wherein the outer-side-surface image capturing device further comprises:
   an upper highlighting illumination unit for outer side surface arranged inside the red illumination unit for outer side surface inspection above the outer-side-surface image capturing position and comprising a light projector radiating red light toward the outer-side-surface image capturing position located below; and
   a lower highlighting illumination unit for outer side surface arranged below the glass plate at the outer-side-surface image capturing position and comprising a light projector radiating red light upward.

5. The visual inspection system according to claim 2, wherein the outer-side-surface image capturing device further comprises:
   an upper highlighting illumination unit for outer side surface arranged inside the red illumination unit for outer side surface inspection above the outer-side-surface image capturing position and comprising a light projector radiating red light toward the outer-side-surface image capturing position located below; and
   a lower highlighting illumination unit for outer side surface arranged below the glass plate at the outer-side-surface image capturing position and comprising a light projector radiating red light upward.

6. The visual inspection system according to claim 1, wherein a light-receiving optical path of the first mirror and a light-receiving optical path of the second mirror of each of the first, second, and third outer-side-surface image capturing units form an angle of 3.5° to 4.5° with respect to a horizontal plane.

7. The visual inspection system according to claim 6, wherein the outer-side-surface image capturing device further comprises:
   an upper highlighting illumination unit for outer side surface arranged inside the red illumination unit for outer side surface inspection above the outer-side-surface image capturing position and comprising a light projector radiating red light toward the outer-side-surface image capturing position located below; and a lower highlighting illumination unit for outer side surface arranged below the glass plate at the outer-side-surface image capturing position and comprising a light projector radiating red light upward.

8. The visual inspection system according to claim 1, wherein the outer-side-surface image capturing device further comprises:
an upper highlighting illumination unit for outer side surface arranged inside the red illumination unit for outer side surface inspection above the outer-side-surface image capturing position and comprising a light projector radiating red light toward the outer-side-surface image capturing position located below; and
a lower highlighting illumination unit for outer side surface arranged below the glass plate at the outer-side-surface image capturing position and comprising a light projector radiating red light upward.

9. The visual inspection system according to claim 1, further comprising:
a lower-inner-side-surface image capturing device capturing an image of a lower inner side surface of the inspection target being conveyed by the conveyance device at a lower-inner-side-surface image capturing position set on the conveyance path; and
an upper-inner-side-surface image capturing device capturing an image of an upper inner side surface of the inspection target at an upper-inner-side-surface image capturing position set on the conveyance path, wherein:
the lower-inner-side-surface image capturing device comprises:
a red illumination unit for lower inner side surface inspection arranged below the glass plate at the lower-inner-side-surface image capturing position; and
first, second, and third lower-inner-side-surface image capturing units arranged around the red illumination unit for lower inner side surface inspection at equal intervals in a circumferential direction about a vertical axis passing through a center point of the lower-inner-side-surface image capturing position;
the red illumination unit for lower inner side surface inspection includes an annular light projector arranged coaxially with the vertical axis at the lower-inner-side-surface image capturing position and radiating red light toward a center thereof from the light projector to mainly illuminate the lower inner side surface of the inspection target present at the lower-inner-side-surface image capturing position;
each of the first, second, and third lower-inner-side-surface image capturing units includes:
first and second mirrors arranged with a predetermined spacing therebetween to receive light reflected from the lower inner side surface of the inspection target at a position below the red illumination unit for lower inner side surface inspection;
a third mirror having two reflective surfaces receiving light reflected from the first and second mirrors and reflecting the light downward; and
a lower-inner-side-surface imaging camera arranged below the third mirror and receiving light from two optical paths reflected from the third mirror and generate a color image;
the upper-inner-side-surface image capturing device comprises:

a red illumination unit for upper inner side surface inspection arranged above the glass plate at the upper-inner-side-surface image capturing position; and
first, second, and third upper-inner-side-surface image capturing units arranged around the red illumination unit for upper inner side surface inspection at equal intervals in a circumferential direction about a vertical axis passing through a center point of the upper-inner-side-surface image capturing position;
the red illumination unit for upper inner side surface inspection includes an annular light projector arranged coaxially with the vertical axis at the upper-inner-side-surface image capturing position and radiating red light toward a center thereof from the light projector to mainly illuminate the upper inner side surface of the inspection target present at the upper-inner-side-surface image capturing position;
each of the first, second, and third upper-inner-side-surface image capturing units includes:
first and second mirrors arranged with a predetermined spacing therebetween to receive light reflected from the upper inner side surface of the inspection target at position above the red illumination unit for upper inner side surface inspection;
a third mirror having two reflective surfaces receiving light reflected from the first and second mirrors and reflecting the light upward; and
an upper-inner-side-surface imaging camera arranged above the third mirror and receiving light from two optical paths reflected from the third mirror and generate a color image; and
the judgment device processing the image captured by the outer-side-surface image capturing device and the images captured by the lower-inner-side-surface image capturing device and the upper-inner-side-surface image capturing device to judge whether the inspection target is defective in appearance or not.

10. The visual inspection system according to claim 9, wherein:
a light-receiving optical path of the first mirror and a light-receiving optical path of the second mirror in the lower-inner-side-surface image capturing device form an angle of 60° with respect to each other about the lower-inner-side-surface image capturing position in a horizontal plane; and
a light-receiving optical path of the first mirror and a light-receiving optical path of the second mirror in the upper-inner-side-surface image capturing device form an angle of 60° with respect to each other about the upper-inner-side-surface image capturing position in a horizontal plane.

11. The visual inspection system according to claim 10, wherein:
the light-receiving optical path of the first mirror and the light-receiving optical path of the second mirror in the lower-inner-side-surface image capturing device and the light-receiving optical path of the first mirror and the light-receiving optical path of the second mirror in the upper-inner-side-surface image capturing device each from an angle of 39.5° to 40.5° with respect to the horizontal plane.

12. The visual inspection system according to claim 11, wherein:
the lower-inner-side-surface image capturing device further comprises:
a lower highlighting illumination unit for lower inner side surface arranged below the red illumination unit for lower inner side surface inspection below the lower-inner-side-surface image capturing position and comprising a light projector radiating red light toward the lower-inner-side-surface image capturing position located above; and an upper highlighting illumination unit for lower inner side surface arranged above the glass plate at the lower-inner-side-surface image capturing position and comprising a light projector radiating red light downward; and the upper-inner-side-surface image capturing device further comprises:

an upper highlighting illumination unit for upper inner side surface arranged above the red illumination unit for upper inner side surface inspection above the upper-inner-side-surface image capturing position and comprising a light projector radiating red light toward the upper-inner-side-surface image capturing position located below; and a lower highlighting illumination unit for upper inner side surface arranged below the glass plate at the upper-inner-side-surface image capturing position and comprising a light projector radiating red light upward.

13. The visual inspection system according to claim 10, wherein:

the lower-inner-side-surface image capturing device further comprises:

a lower highlighting illumination unit for lower inner side surface arranged below the red illumination unit for lower inner side surface inspection below the lower-inner-side-surface image capturing position and comprising a light projector radiating red light toward the lower-inner-side-surface image capturing position located above; and an upper highlighting illumination unit for lower inner side surface arranged above the glass plate at the lower-inner-side-surface image capturing position and comprising a light projector radiating red light downward; and the upper-inner-side-surface image capturing device further comprises:

an upper highlighting illumination unit for upper inner side surface arranged above the red illumination unit for upper inner side surface inspection above the upper-inner-side-surface image capturing position and comprising a light projector radiating red light toward the upper-inner-side-surface image capturing position located below; and a lower highlighting illumination unit for upper inner side surface arranged below the glass plate at the upper-inner-side-surface image capturing position and comprising a light projector radiating red light upward.

14. The visual inspection system according to claim 9, wherein:

a light-receiving optical path of the first mirror and a light-receiving optical path of the second mirror in the lower-inner-side-surface image capturing device and a light-receiving optical path of the first mirror and a light-receiving optical path of the second mirror in the upper-inner-side-surface image capturing device each from an angle of 39.5° to 40.5° with respect to a horizontal plane.

15. The visual inspection system according to claim 14, wherein:

the lower-inner-side-surface image capturing device further comprises:

a lower highlighting illumination unit for lower inner side surface arranged below the red illumination unit for lower inner side surface inspection below the lower-inner-side-surface image capturing position and comprising a light projector radiating red light toward the lower-inner-side-surface image capturing position located above; and an upper highlighting illumination unit for lower inner side surface arranged above the glass plate at the lower-inner-side-surface image capturing position and comprising a light projector radiating red light downward; and the upper-inner-side-surface image capturing device further comprises:

an upper highlighting illumination unit for upper inner side surface arranged above the red illumination unit for upper inner side surface inspection above the upper-inner-side-surface image capturing position and comprising a light projector radiating red light toward the upper-inner-side-surface image capturing position located below; and a lower highlighting illumination unit for upper inner side surface arranged below the glass plate at the upper-inner-side-surface image capturing position and comprising a light projector radiating red light upward.

16. The visual inspection system according to claim 9, wherein:

the lower-inner-side-surface image capturing device further comprises:

a lower highlighting illumination unit for lower inner side surface arranged below the red illumination unit for lower inner side surface inspection below the lower-inner-side-surface image capturing position and comprising a light projector radiating red light toward the lower-inner-side-surface image capturing position located above; and an upper highlighting illumination unit for lower inner side surface arranged above the glass plate at the lower-inner-side-surface image capturing position comprising a light projector radiating radiate red light downward; and the upper-inner-side-surface image capturing device further comprises:

an upper highlighting illumination unit for upper inner side surface arranged above the red illumination unit for upper inner side surface inspection above the upper-inner-side-surface image capturing position and comprising a light projector radiating red light toward the upper-inner-side-surface image capturing position located below; and a lower highlighting illumination unit for upper inner side surface arranged below the glass plate at the upper-inner-side-surface image capturing position and comprising a light projector radiating red light upward.

* * * * *